US010502811B2

(12) United States Patent
Li et al.

(10) Patent No.: US 10,502,811 B2
(45) Date of Patent: Dec. 10, 2019

(54) NETWORK ARCHITECTURE, RADIO FREQUENCY BASED ASSET TRACKING AND/OR LOCATION ESTIMATION METHODS AND SYSTEMS

(71) Applicant: ABL IP HOLDING LLC, Conyers, GA (US)

(72) Inventors: Xiangrong Li, Brookline, MA (US); Jesse Grant, Needham, MA (US); Sajin George, Somerville, MA (US); Emanuel Paul Malandrakis, Boston, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/295,623

(22) Filed: Mar. 7, 2019

(65) Prior Publication Data
US 2019/0277939 A1 Sep. 12, 2019

Related U.S. Application Data

(60) Provisional application No. 62/640,773, filed on Mar. 9, 2018.

(51) Int. Cl.
*G01S 5/02* (2010.01)
*G01S 13/87* (2006.01)
(Continued)

(52) U.S. Cl.
CPC .......... *G01S 5/0284* (2013.01); *G01S 13/878* (2013.01); *H04B 17/318* (2015.01);
(Continued)

(58) Field of Classification Search
CPC ... G01S 5/0284; G01S 13/878; H04B 17/318; H04W 64/003; H04W 88/16
See application file for complete search history.

(56) References Cited

U.S. PATENT DOCUMENTS 5,917,425 A  6/1999 Crimmins et al.
6,657,549 B1  12/2003 Avery
(Continued)

FOREIGN PATENT DOCUMENTS

EP   1439649 A1    7/2004
WO   2008006077 A2  1/2008
WO   2012175957 A1  12/2012

OTHER PUBLICATIONS

U.S. Appl. No. 15/916,893, filed Mar. 9, 2018, 51 pages.
(Continued)

*Primary Examiner* — Ernest G Tacsik
(74) *Attorney, Agent, or Firm* — RatnerPrestia

(57) ABSTRACT

Radio frequency-enabled nodes, in an example asset tracking system, receive a basic message including an asset tracking tag identifier from an asset tag. The nodes measure a signal attribute of the received message; and each receiving node transmits a node asset message including the asset tag identifier, a respective node identifier, and the measured signal attribute. Edge gateways each receive one or more node asset messages transmitted by some number of the radio frequency-enabled nodes and rank respective node identifiers based on the measured signal attribute. Each edge gateway forwards an aggregated message to a fog gateway, which parses data from the aggregated messages to form a node identifier tuple identifying at least three nodes near the asset tag. Ordered identifiers from the tuple and known locations of the identified nearby nodes can then be processed to estimate of the location of the asset tag.

16 Claims, 18 Drawing Sheets

(51) Int. Cl.
*H04B 17/318* (2015.01)
*H04W 88/16* (2009.01)
*H04W 64/00* (2009.01)
*H04W 84/18* (2009.01)

(52) U.S. Cl.
CPC ......... *H04W 64/003* (2013.01); *H04W 88/16* (2013.01); *H04W 84/18* (2013.01)

(56) References Cited

U.S. PATENT DOCUMENTS

| | | |
|---|---|---|
| 6,862,430 B1 | 3/2005 | Duffy et al. |
| 7,312,752 B2 | 12/2007 | Smith et al. |
| 7,324,824 B2 | 1/2008 | Smith et al. |
| 7,372,365 B2 | 5/2008 | Jackson |
| 7,528,716 B2 | 5/2009 | Jackson |
| 7,545,326 B2 | 6/2009 | Caliri et al. |
| 7,577,444 B2 | 8/2009 | Bird et al. |
| 7,602,338 B2 | 10/2009 | Smith et al. |
| 7,719,418 B2 | 5/2010 | Grossman |
| 7,791,470 B2 | 9/2010 | Karr |
| 7,872,581 B2 | 1/2011 | Darianian et al. |
| 7,941,096 B2 | 5/2011 | Perkins et al. |
| 7,965,174 B2 | 6/2011 | Wong et al. |
| 8,019,354 B2 | 9/2011 | Rae et al. |
| 8,026,814 B1 | 9/2011 | Heinze et al. |
| 8,031,120 B2 | 10/2011 | Smith et al. |
| 8,089,344 B1 | 1/2012 | Zand |
| 8,149,090 B2 | 4/2012 | Hall et al. |
| 8,155,664 B2 | 4/2012 | McFarland |
| 8,294,568 B2 | 10/2012 | Barrett |
| 8,305,190 B2 | 11/2012 | Moshfeghi |
| 8,373,562 B1 | 2/2013 | Heinze et al. |
| 8,400,268 B1 | 3/2013 | Malik et al. |
| 8,531,273 B2 | 9/2013 | Overhultz et al. |
| 8,558,672 B2 | 10/2013 | Zand |
| 8,598,988 B2 | 12/2013 | Overhultz et al. |
| 8,674,806 B1 | 3/2014 | Malik et al. |
| 8,674,829 B2 | 3/2014 | Karam et al. |
| 8,787,961 B2 | 7/2014 | Skalicky |
| 8,854,205 B2 | 10/2014 | Daniel |
| 8,867,993 B1 | 10/2014 | Perkins et al. |
| 9,100,788 B2 | 8/2015 | Karam et al. |
| 9,138,825 B2 | 9/2015 | Albrect et al. |
| 9,324,202 B2 | 4/2016 | Lindig et al. |
| 9,436,858 B2 | 9/2016 | Liao |
| 9,525,969 B2 | 12/2016 | Evans et al. |
| 9,711,047 B1 | 7/2017 | Knas et al. |
| 9,711,048 B1 | 7/2017 | Knas et al. |
| 9,721,451 B1 | 8/2017 | Knas et al. |
| 9,741,237 B1 | 8/2017 | Knas et al. |
| 9,877,266 B1 | 1/2018 | Knas et al. |
| 9,877,298 B1 | 1/2018 | Knas et al. |
| 9,881,484 B1 | 1/2018 | Knas et al. |
| 9,949,091 B1 | 4/2018 | Knas et al. |
| 9,984,556 B1 | 5/2018 | Knas et al. |
| 10,210,353 B1 | 2/2019 | Li et al. |
| 2006/0097046 A1 | 5/2006 | Fassio et al. |
| 2008/0231449 A1 | 9/2008 | Moshfeghi |
| 2010/0110948 A1 | 5/2010 | Batta |
| 2010/0214116 A1 | 8/2010 | Huang et al. |
| 2011/0012782 A1 | 1/2011 | Lee et al. |
| 2012/0001728 A1 | 1/2012 | Janiszewski |
| 2012/0050101 A1 | 3/2012 | Whiteman |
| 2012/0119883 A1 | 5/2012 | Bekritsky |
| 2012/0158238 A1 | 6/2012 | Daley et al. |
| 2013/0072223 A1 | 3/2013 | Berenberg et al. |
| 2013/0342402 A1 | 12/2013 | Pesonen |
| 2015/0085669 A1 | 3/2015 | Prechner et al. |
| 2015/0105099 A1* | 4/2015 | Luo ..................... H04W 64/003 455/456.1 |
| 2016/0026837 A1* | 1/2016 | Good ..................... G16Z 99/00 340/539.13 |
| 2017/0006411 A1* | 1/2017 | Zakaria ................... H04W 4/80 |
| 2019/0095852 A1* | 3/2019 | Sanjay ................ G06Q 10/087 |

OTHER PUBLICATIONS

Beutel, J., Geolocation in a RPicoRadio Environment, Diploma Thesis, Jul. 1999—121 pages.
Savvides et al., "Dynamic Fine-Grained Localization in Ad-Hoc Networks of Sensors", Technical Report TM-UCLA-NESL, 2001, 14 pages.
Notice of Allowance for U.S. Appl. No. 15/916,861, dated Oct. 4, 2018—21 pages.
Non Final Office Action for U.S. Appl. No. 15/916,893, dated Dec. 14, 2018, 39 pages.
U.S. Appl. No. 15/916,861, filed Mar. 9, 2018, 57 pages.
Notice of Allowance for U.S. Appl. No. 15/916,893, dated Apr. 24, 2019, 8 pages.

* cited by examiner

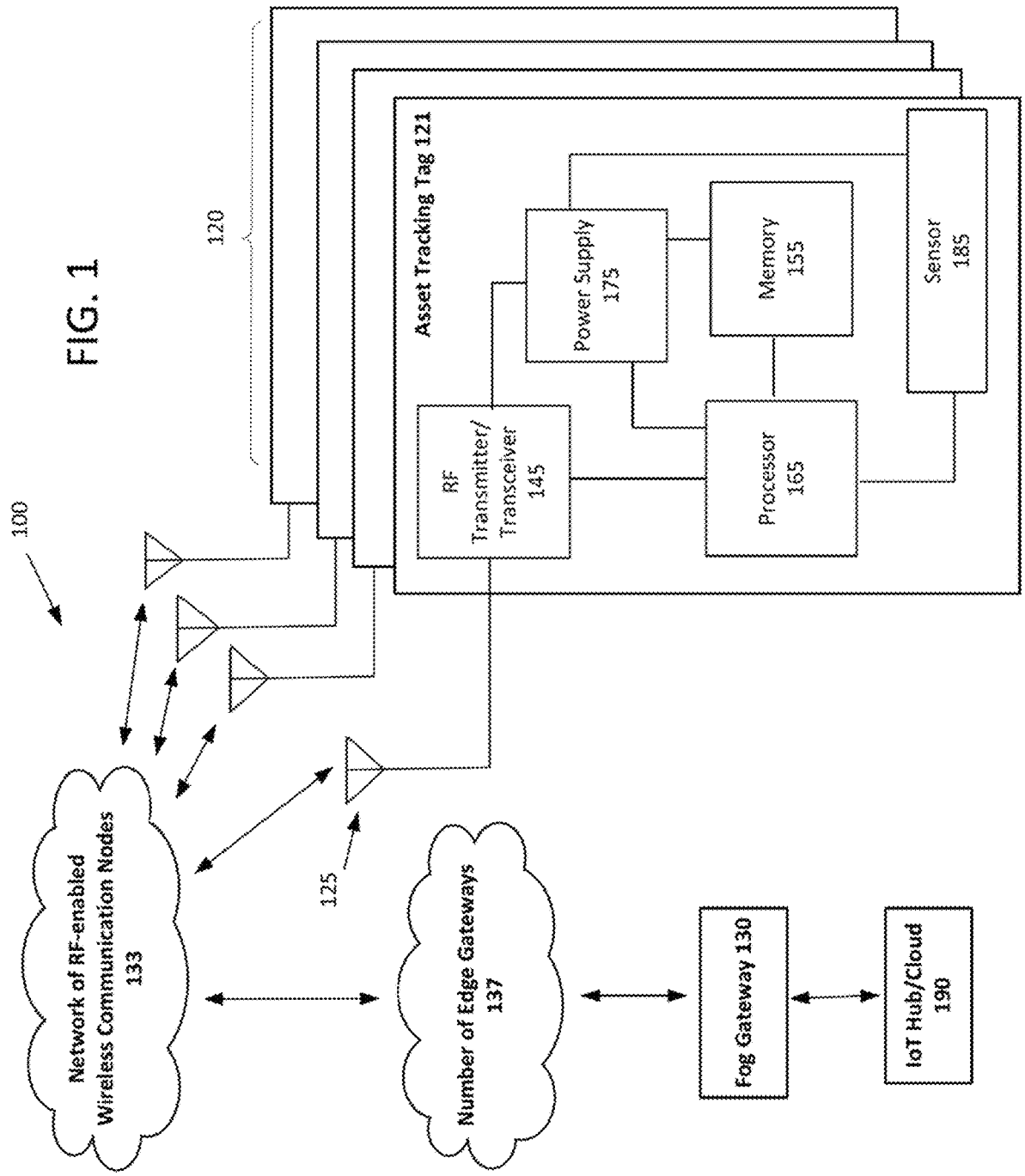

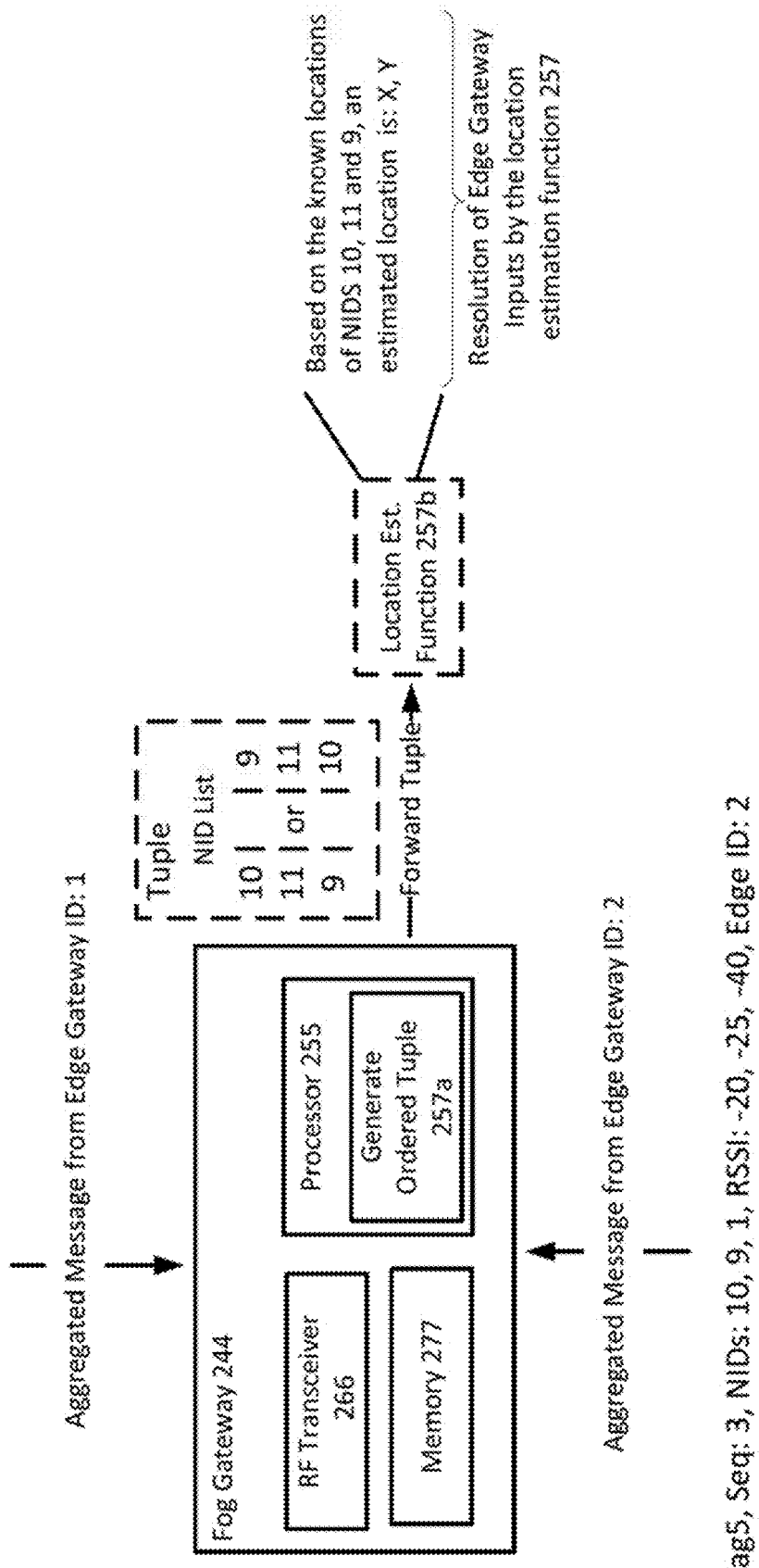

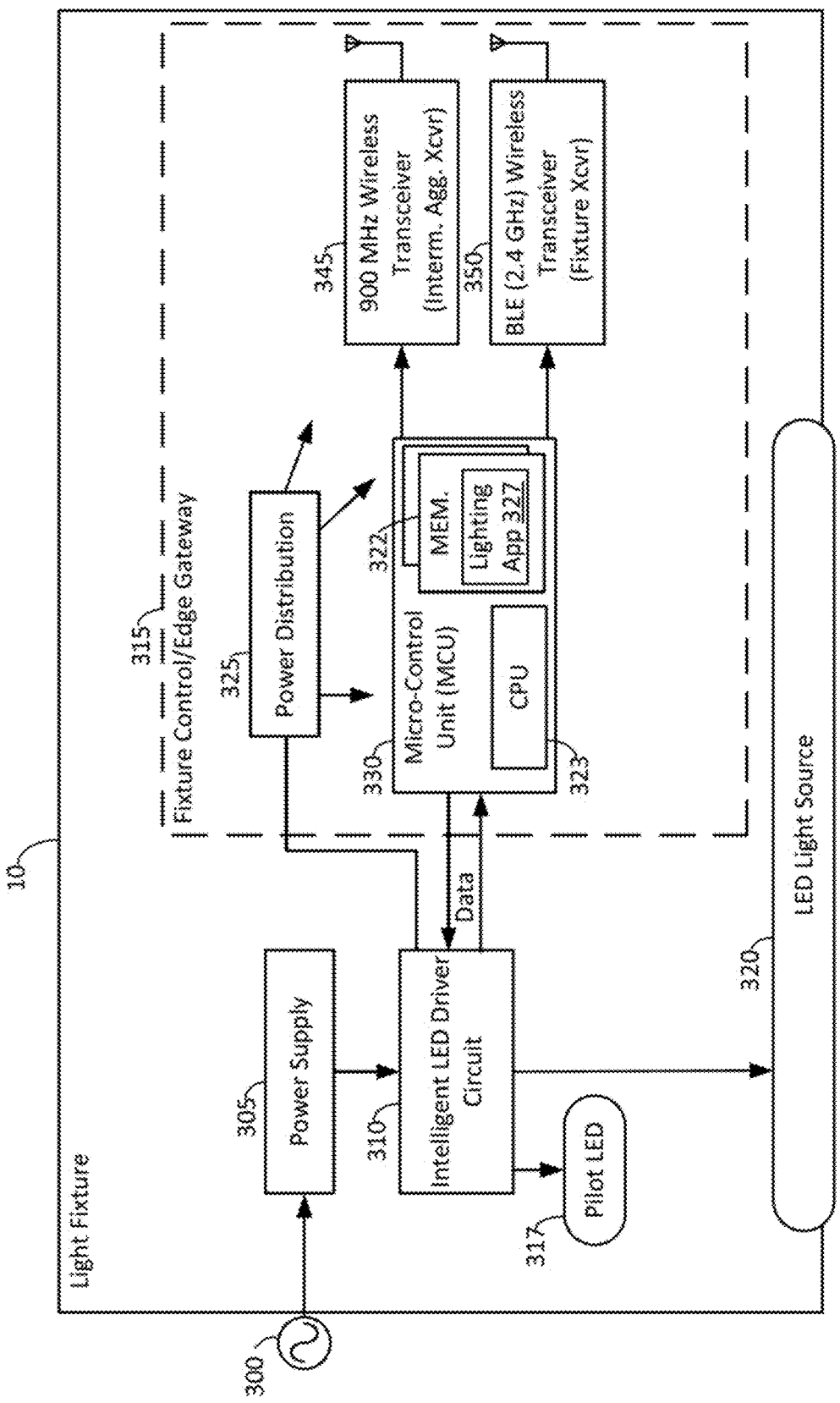

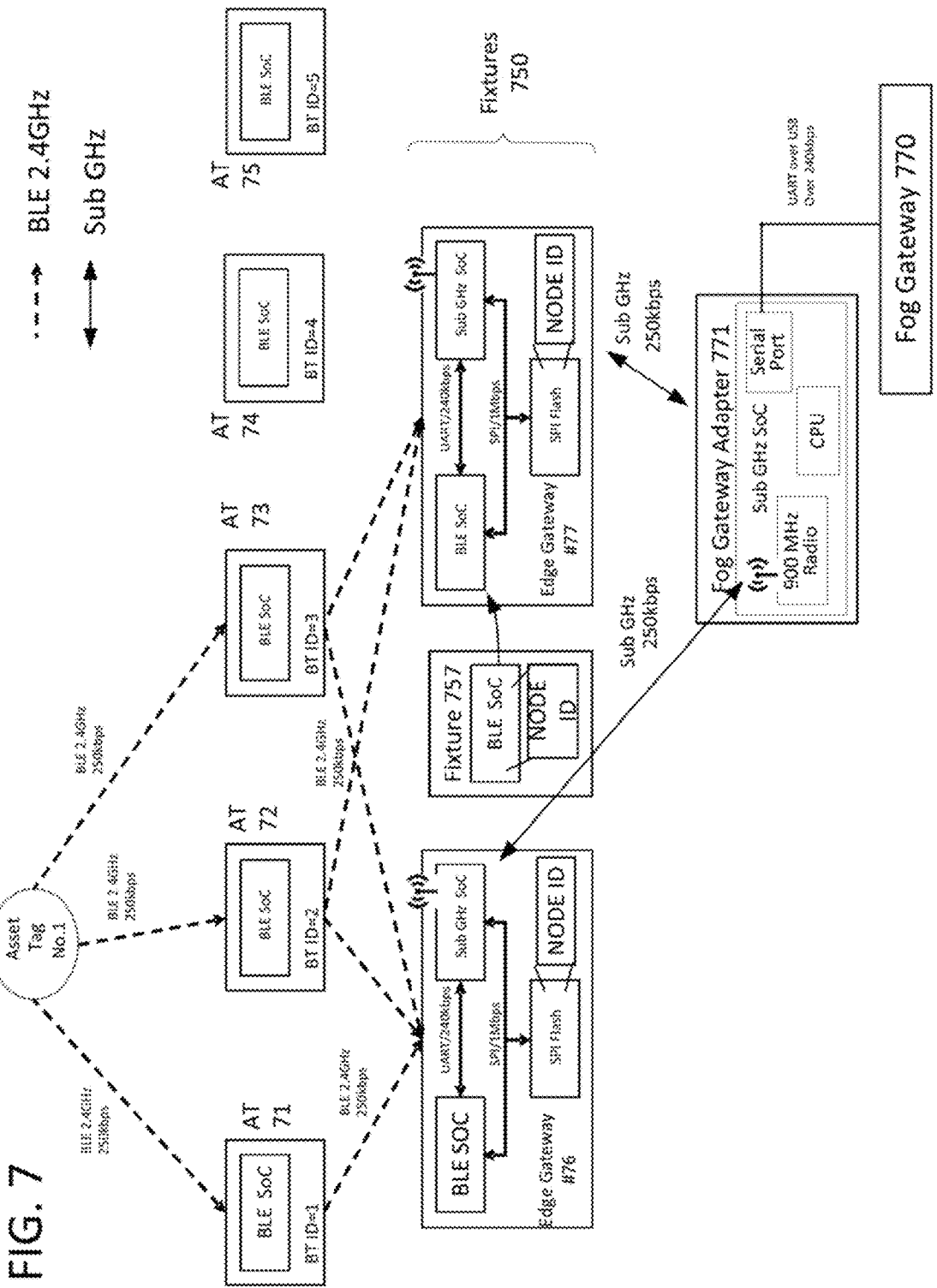

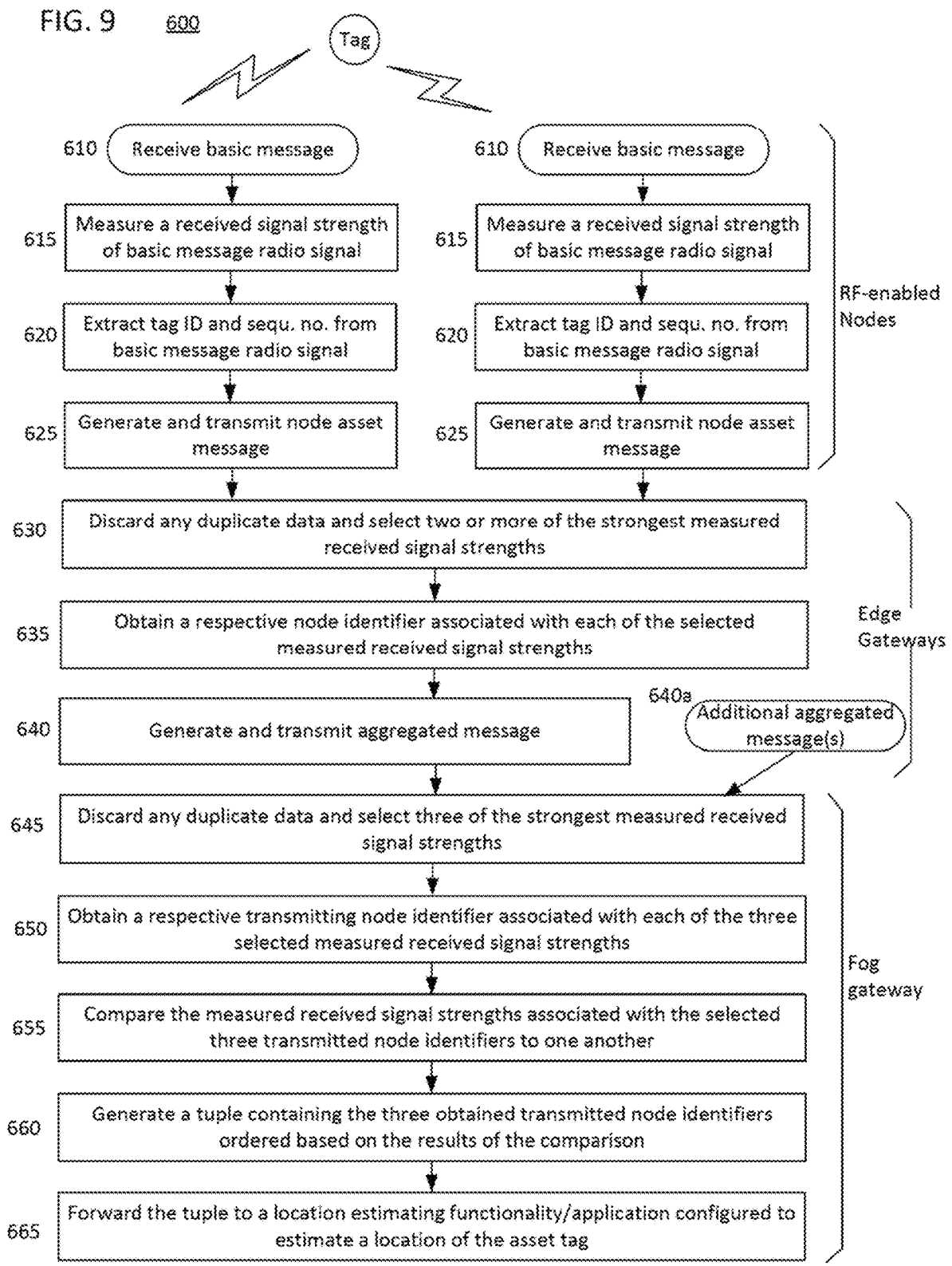

NETWORK ARCHITECTURE, RADIO FREQUENCY BASED ASSET TRACKING AND/OR LOCATION ESTIMATION METHODS AND SYSTEMS

CROSS-REFERENCE TO RELATED APPLICATION

This application claims the benefit of U.S. Provisional Application No. 62/640,773 Filed Mar. 9, 2018 entitled "NETWORK ARCHITECTURE, RADIO FREQUENCY BASED ASSET TRACKING AND/OR LOCATION ESTIMATION METHODS AND SYSTEMS," the disclosure of which is entirely incorporated herein by reference.

This application also is related to U.S. application Ser. No. 15/916,861 Filed Mar. 9, 2018 entitled "ASSET TAG TRACKING SYSTEM AND NETWORK ARCHITECTURE," the disclosure of which is entirely incorporated herein by reference.

This application also is related to U.S. application Ser. No. 15/916,893 Filed Mar. 9, 2018 entitled "MORE ACCURATE ASSET TAG LOCATING OF RADIO FREQUENCY DEVICES," the disclosure of which is entirely incorporated herein by reference.

TECHNICAL FIELD

In various examples, the present subject matter relates generally to a system and method for estimating a location of an asset tracking tag within a space while minimizing data traffic within a wireless network that supports the tracking and/or to improvements in the location estimation, e.g. based on aspects of the network configuration.

BACKGROUND

Previous systems relied upon the detection of an asset tracking device, commonly referred to as an "asset tag," by a detection device. For example, the asset with the tag would pass by the detection device and the detection device would by some detection means detect the "tag" or other identifier attached to the asset. The asset tracking system would know the location of the asset because the system would have knowledge of the location of the detection device.

An asset tracking tag may be or include a radio frequency identifying (RFID) tag or the like attached to the asset. Like a barcode, the RFID tag provides information about or associated with the asset, such as a particular tag identifier. However, as RF technology has advanced, the RF transceivers have become more power efficient and smaller thereby allowing RF transceivers with greater range and computing power to be employed in the asset tracking tags.

With the advances in RF technology comes the problem of increased RF signal traffic within a space as well as increased data processing demands on devices within the space coupled to the data network. In addition, the advanced RF technology brings an expectation of improved accuracy in the determination of asset tag location within a space.

Presently, systems utilize complex and overly complicated computations and require large data sets to provide location determination services. As a result, data network traffic is increased without necessarily providing a corresponding increase in the accuracy of the location estimation.

Asset tracking systems employing radio frequency detection often require the detector(s) to actively engage the tag attached to the asset being tracked. Other examples include more complex asset tracking tags that may communicate with devices within the location in order to update information related to the tag or its location, and report the location of an asset through wireless radio frequency communication. The transmission of position updates and data reporting causes the asset tracking tag to continuously operate in a high power consumption state.

Locations of radio devices (e.g. tags) in an area served by a network of RF beacons having known locations can be estimated by a variety of techniques. Received signal strength of signals transmitted by a tag, a RF beacon, or both may be measured by a tag and/or the RF beacon, and used as a proxy for node-to-tag distance (assuming that all nodes transmit signals of equal strength): the farther away the transmitting tag/node, the lower the received signal strength. Present systems require the transmission of the RSS values as well as additional information for the determination of the location of an asset tag. However, this continuous processing of and transmission of data consumes power and adds traffic to the RF communication channels.

SUMMARY

Hence, there is room for further improvement in an asset tracking tag location estimation system or process, to alleviate one or more of the above noted concerns.

A system, for example, includes a number of edge gateways distributed about a space and radio frequency-enabled nodes distributed about the space. Each edge gateway has an edge gateway processor and an edge gateway radio frequency transceiver system. The edge gateway radio frequency transceiver systems are configured to communicate via a first frequency band and a second frequency band. Each of radio frequency-enabled nodes includes a node processor as well as a node radio frequency transceiver configured to receive and transmit radio frequency signals via the first frequency band. The system also includes a fog gateway having a fog gateway radio frequency transceiver and a fog gateway processor. The fog gateway radio frequency transceiver is configured to communicate via the second frequency band with each edge gateway radio frequency transceiver system.

In the example system, each edge gateway has a radio frequency coverage area within the space, at least with respect to the first frequency band; and each edge gateway is configured by its processor to communicate with some of the radio frequency-enabled nodes within the respective radio frequency coverage area via the first frequency band. Each edge gateway also is configured by its processor to transmit an aggregated message including an identifier of each of one or more of the radio frequency-enabled nodes within the respective coverage area. Inclusions of an identifier in the aggregated message is based on a node asset message received from each of the one or more radio frequency-enabled nodes within the respective coverage area. Each node asset message received at an edge gateway includes an identifier of a respective radio frequency-enabled node, an identifier of a radio frequency-enabled tag obtained from a radio frequency signal received from the radio frequency-enabled tag by the respective radio frequency-enabled node within the respective edge gateway's coverage area, and a measured signal attribute of the signal that the respective node received from the radio frequency-enabled tag.

In the example system, the fog gateway is configured by its processor to receive a respective aggregated message from some number of the edge gateways. The fog gateway parses the received aggregated messages to obtain a node identifier tuple for use in a determination of location of the radio frequency-enabled tag within the space.

A method, for example, includes receiving, at three or more radio frequency-enabled nodes distributed about a space, a basic message transmitted by an asset tracking tag. The basic message includes an identifier of the asset tracking tag and a basic message sequence number. Three or more of the radio frequency-enabled nodes measure a signal attribute of the received basic message and associate the measured signal attribute with a node identifier of the respective radio frequency-enabled node making the signal attribute measurement. Each of the the nodes transmits a node asset message, which includes the asset tracking tag identifier, the basic message sequence number, the node identifier of the respective one of the radio frequency-enabled nodes that is transmitting the respective node asset message, and the measured signal attribute of the basic message measured by the respective node.

In the example method, two or more edge gateways receive a respective transmitted node asset message transmitted by each of the three or more radio frequency-enabled nodes. In response to received node asset messages, each edge gateway determines a number of respective node identifiers of nodes nearest to the asset tracking tag based on the signal attribute of the basic message measured by the one or more nodes. Each of the edge gateways forwards to a fog gateway of the space, an aggregated message including the asset tracking tag identifier, the basic message sequence number, a list of the number of node identifiers in association with respective highest measured signal attribute values, and an identifier of the respective edge gateway. The example method also involves parsing aggregated messages from the two or more edge gateways to remove any duplicate data and obtain a node identifier tuple, and estimating location of the radio frequency-enabled tag within the space based at least in part on node identifiers in the node identifier tuple.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 1 shows an example system including asset tracking tags, radio frequency (RF) enabled wireless communication nodes, edge gateways, a fog gateway and an optional hub/cloud system.

FIGS. 4A and 4B depict examples of the message flows within a system, such as the example system of FIG. 1.

FIGS. 6A-6C depict logical, functional, and structural features of several examples of a radio frequency communication enabled light fixture suitable for use as a node and/or an edge gateway in a network of RF-enabled wireless communication nodes.

FIG. 7 illustrates a specific example of a system configuration and message flow diagram that utilizes system-on-a-chip (SOC) configurations for an asset tracking tag system.

FIG. 9 is a flow diagram of a process example illustrating a process for receiving signals from an asset tracking tag and producing an ordered tuple in a system for example like that of FIG. 1, and as may be used in estimating a location of an asset tag within a space.

DETAILED DESCRIPTION

Figure 2A:
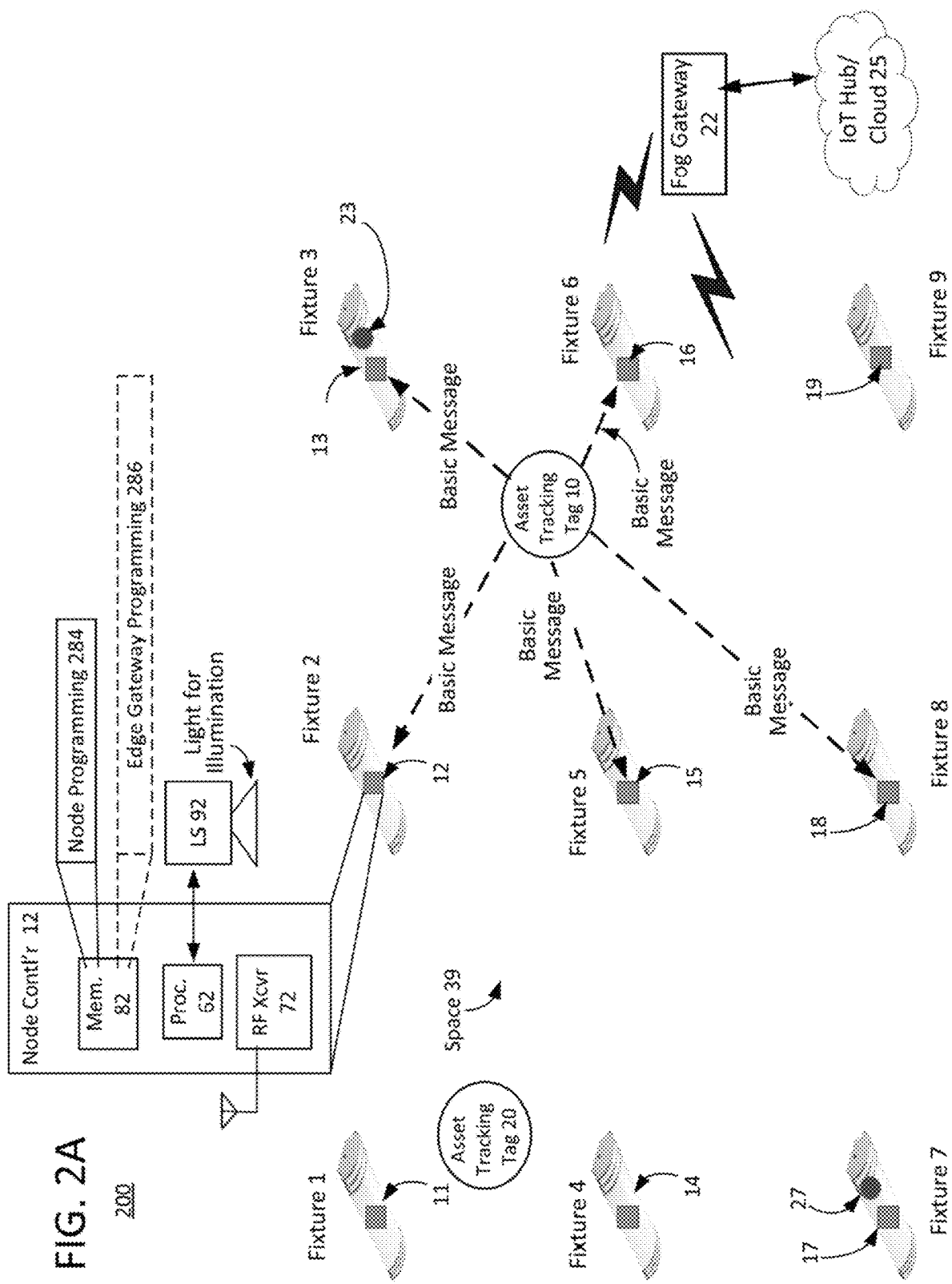
FIGS. 2A, 2B and 2C depict a simplistic system example of the functions performed by each of the system components, such as those described with reference to FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed is detail below and in the accompanying drawings relate to technologies to collect data from and/or based on radio frequency signals from an RF-enabled asset tracking take, aggregate and parse the data to a for tuple of relevant node identifiers and process the tuple to estimate location of the asset tracking tag (and any asset with which the tag may be physically associated).

Initial sections of this detailed description and a number of drawings (e.g. FIGS. 1 to 7) focus on examples of a system and method for estimating a location of an asset tracking tag within a space while minimizing data traffic within a wireless network that supports the tracking. Later sections of this detailed description and a number of drawings (e.g. FIGS. 8A to 11) focus on improvements in the estimation of the location of radio frequency (RF) enabled asset tracking tags that are in communication with RF enabled nodes in the example systems, such as may be deployed at ceiling level incorporated into luminaires.

The disclosed network architecture and system reduces data traffic in a network and provides improved asset tag tracking. The improved asset tag tracking system and network architecture may be implemented via a data communication system. Such a data communication system may include, for example, a number of RF-enabled wireless communication nodes distributed about a space, a number of edge gateways and a fog gateway. Each of the number of RF-enabled wireless communication nodes may include a processor and a node radio frequency transceiver configured to receive and transmit signals radio frequency signals. Each of the edge gateways may include a processor and a radio-frequency transceiver system. The radio-frequency transceiver system of an edge gateway may be configured to communicate with the node radio frequency transceivers of RF-enable wireless communication nodes in the coverage area of the transceiver system of the edge gateway, for example, via a first frequency band. The fog gateway may be communicatively coupled to each of the edge gateways. The fog gateway includes a fog gateway radio frequency transceiver and a processor. The fog gateway radio frequency transceiver is configured to communicate with the edge gateway transceiver systems, for example, via a second frequency band.

In the later detailed processing examples using in part a node identifier tuple, each of the number of the RF-enabled wireless communication nodes may be configured to receive a basic message transmitted by an asset tracking tag located in the space, and measure a signal attribute of the received basic message. The measured signal attribute may be associated (e.g. in a node memory) with a node identifier of the respective node that made the signal attribute measurement. The basic message includes an identifier of the asset tracking tag and may include a basic message sequence number. Each RF-enabled wireless communication node may be configured to transmit a node asset message to an edge gateway. The node asset message includes the asset tracking tag identifier, the basic message sequence number (if provided), a node identifier of the respective wireless communication node transmitting the respective node asset message, and the measured signal attribute of the basic message measured by the respective wireless communication node that is transmitting the respective node asset message.

Edge gateways may be configured to receive the respective transmitted node asset message transmitted by each of the three or more wireless communication nodes. Each edge gateway that receives such node asset messages may determine respective node identifiers of a number of respective nodes nearest to the asset tracking tag, based on the measured signal attribute of the basic message included in each respective node asset message.

An aggregated message may be forwarded from each edge gateway to the fog gateway. Each aggregated message may include the asset tracking tag identifier, the basic message sequence number (if provided), and a list of the node identifiers associated with a respective one of the highest measured signal attribute values.

The fog gateway may be configured to receive a respective aggregated message from each of the edge gateways; and obtain an estimate of the location of the asset tracking tag within the space based on the list of the node identifiers. A more accurate asset tag location estimation system and method usable with the example network architecture may be based on data provided by different devices, such as the asset tags and/or nodes within a system. A tuple, or ordered list, may be generated or formed containing the ranked respective node identifiers along with the asset tracking tag identifier, the basic message sequence number (if provided), and possibly the measured signal attribute values. The tuple, for example, may be as simple as a list of three or more node identifiers for nodes having report respective highest measured signal attribute values.

The computing device, e.g. at or coupled to the fog gateway, may be configured to determine, based on the generated tuple and the specific node locations associated with the node identifiers in the tuple, that the asset tag is located within a polygonal region in which the vertices of the polygonal region are the specific node locations of the nodes indicated by the node identifiers in the tuple. In a specific example, using three node identifiers, the computing device may be configured to determine a location of the asset tag within a triangular region (e.g. $\Delta abc$) or other polygonal region approximated using the specific node locations of the three or more node identifiers as vertices of the region. This determination of the location of the asset tag within the polygonal region in the space may be referred to as a coarse asset tag location determination.

The computing device may evaluate the order of the node identifiers in the list of node identifiers using a data set with a list of inequalities of the measured signal attributes. The computing device, for example, may as part of the evaluation compare the order of the node identifiers in the tuple to an order of elements in the inequalities of the obtained data set or look up table. Based on the results of the comparison, the computing device may identify an inequality corresponding to an order of the node identifiers in the list of node identifiers in the tuple. As part of the list of inequalities, each inequality may include an indication of a subregion within the determined polygonal region. Using the identified inequality and the subregion indication, the computing device may estimate the location of the asset tag as being located in a particular indicated subregion. This may be considered a fine estimation of the asset tag location.

An additional process may alter the area of the respective subregions based on differences between the respective signal attribute measurements determined by the asset tag. For example, a difference between a first signal attribute measurement value and a second signal attribute value may be determined, a difference between the first signal attribute measurement value and a third signal attribute measurement value may be determined, and a difference between first signal attribute measurement value and the third signal attribute value may be determined. These differences may be referred to as delta values. The delta values may be used to provide a finer level of accuracy to the location estimation.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from any luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output from the device.

The example network architecture utilizes flooding type communication, e.g. over two radio frequency wireless communication bands/technologies. Generally speaking, network flooding is a communication technique in which a router or the like forwards a message over all of its outgoing routes or ports but not over the route or port through which the router received the message. In some examples discussed more fully below, a source (e.g. fog) gateway floods a message to the edge gateways (e.g. via a wireless broadcast) over a one band or protocol (e.g. WiFi or sub-gigahertz PAN). Then, each edge gateway reformats the message and floods the message to some number of end nodal devices (e.g. RF-enabled nodes) within range and/or coverage area via wireless broadcasting over another band or protocol (e.g. BLE or Zigbee). In the opposite upstream direction, each RF-enabled end node device broadcasts over the other band or protocol (e.g. BLE or Zigbee), for receipt by one of the edge gateways; and the edge gateway transmits messages over the one band or protocol (e.g. WiFi or sub-gigahertz PAN), typically to the source (e.g. fog) gateway.

Reference now is made in detail to the examples illustrated in the accompanying drawings and discussed below. FIG. 1 illustrates an example system 100 including asset tracking tags 120, a system 133 of radio frequency (RF) enabled wireless communication nodes, as number 127 of edge gateways, a fog gateway 137 and an optional hub/cloud system 190.

The RF-enabled asset tracking tags 120 may be small, smart, powered devices that exchange radio signals with RF-enabled nodes having networked radio capability, such as the network of RF-enabled wireless communication nodes 133. Although tags 120 may only transmit, the example asset tracking tag 121 is active in that it actively communicates to obtain and it actively processes data and sends information. In most examples, the networked nodes of network 133 are lighting devices. A tag operates in a wireless flooding network of the RF-enabled lighting devices (described in more detail with FIG. 2). The asset tracking tag communication and location system 100 may include a number of asset tracking tags 120, a network of RF-enabled wireless noted, a number of edge gateways 137, a fog gateway 130 and an internet-of-things (IoT) hub 190 (such as a server application running on a cloud platform). The system 100 is configured to enable the asset tracking tags 120 to send messages designated for delivery, for example, to one of the number edge gateways 137, and/or to the fog gateway 130. It may be appropriate to discuss an example configuration of one of the asset tracking tags 120 in more detail.

In order to communicate, the asset tracking tag 121 may include an antenna 125, a radio frequency (RF) transmitter or transceiver 145, a processor 165, a memory 155, and a sensor 185. The antenna 125 may be coupled to the RF transmitter or transceiver 145, and configured to receive and/or emit signals within a specific first radio frequency band that is compatible with the RF transmitter or receiver 145. The RF transmitter/transceiver 145 may be a Bluetooth transmitter/transceiver, a Zigbee transmitter/transceiver, a radio frequency identifier (RFID) transmitter/transceiver, a Wi-Fi transmitter/transceiver or other wireless communication transmitter/transceiver suitable for use in an asset tracking tag.

The processor 165 may be coupled to the RF transmitter/transceiver 145, the power supply 175, the memory 155 and the sensors 185. The processor 165 may send signals to the RF transmitter/transceiver 145 for transmission and/or receive signals received by the RF transmitter/transceiver 145 obtained via the antenna. For example, the fog gateway 130 may be able to download commands via the number of edge gateways 137 to individual nodes (not shown) within the network of RF-enabled wireless communication nodes 133 and/or for communication to active tags like tag 121.

The tag memory 155 may be a non-volatile memory, random access memory (RAM), read only memory (ROM), a Flash memory or the like. The memory 155 may be configured to store programming instructions executable by the processor 165. Upon execution of the programming instructions stored in the memory 155, the processor 165 may be configured to perform different functions. Examples of the different functions that the processor 165 may be configured to perform upon execution of the programming instructions are described in more detail with reference the examples of FIGS. 2-6. The different functions may be internal to the processor 165. For example, the processor 165 may include a counter that is monitored by the processor 165. At a predetermined count, the processor 165 may transmit a signal, such as a basic message.

The power supply 175 may be a battery, a solar cell, or other form of quickly available power that is suitable for driving the various electronics associated with the asset tracking tag 121 components, such as the RF transmitter/transceiver 145, the processor 165, the memory 155 and/or the sensor 185.

The sensor 185 may be configured to detect and respond to an event that occurs in the environment in which the asset tracking tag 121 is located. For example, the sensor 185 may be, for example, one or more of an accelerometer, thermometer, a photocell, a microphone, a shock sensor, or the like. In response to a detected stimulus (e.g., temperature, movement, noise, ambient light), the sensor 185 may output a signal causing the processor 165 to perform a function or process such as generation and transmission of a basic message.

Examples of such a function or process are described in more detail with reference to other figures. For example, each of the asset tracking tags, such as 121, may be configured to transmit signals, such as a basic message, an asset tag status message and other signals, to one or more of the RF-enabled wireless communication nodes of the network 133. One or more of the RF-enabled wireless communication nodes of the network 133 may be configured to receive the signals transmitted from respective asset tracking tags 120.

The asset tracking tags 120 may also be configured to receive signals, for example, from the fog gateway 130 via the network of the edge gateways and the network of RF-enabled wireless communication nodes. More details of this function of the example of system 100 is described in reference to other figures.

The number of individual RF-enabled wireless communication nodes in the network of RF-enabled wireless communication nodes 133 may be 10, 100, 1000 or more. Each of the RF-enabled wireless communication nodes (shown in other examples) of the network of RF-enabled wireless communication nodes 133 may be configured with a compatible RF transceiver to communicate with the RF transmitter/transceiver of the asset tracking tags 120. The RF transceiver of a respective node in the network 133 may be a Bluetooth transceiver, a Zigbee transceiver, a radio frequency identifier (RFID) transceiver, a Wi-Fi transceiver or other wireless communication transceiver.

The respective RF-enabled nodes of the network 133 may be configured to transmit signals to the edge gateways 137. The signals transmitted by the respective RF-enabled node may include information obtained from the signals transmitted by the respective ones of the asset tracking tags 120.

The number of edge gateways 137 may include one, two or more individual edge gateways. The number of edge gateways 137 may be less than the number of nodes in the network of RF-enabled wireless communication nodes 133. Each of the edge gateways of the number of edge gateways 137 may be include a processor, a transceiver system include a first radio-frequency transceiver and a second radio-frequency transceiver, and a memory (not shown in this example). For example, the first radio-frequency transceiver of each edge gateway may be configured to operate in the first frequency band compatible with the node radio frequency transceivers. The second node radio frequency transceiver of each edge gateway may be configured to receive and transmit signals in a second frequency band different from the first frequency band. The edge gateways of the network 137 may use the second radio frequency transceiver to receive and transmit signals in the second frequency band from and to the fog gateway 130. For example, each edge gateway may be configured to receive signals according to a first communication protocol in the first RF band (e.g., Bluetooth), translate and/or convert the received signals into a second communication protocol in the second RF band (e.g. WiFi or sub-GHz). Details of an edge gateway will be described in more detail with reference to FIG. 6.

The fog gateway 130 may include a fog gateway radio frequency (RF) transceiver, a processor and a memory (not shown in this example). The fog gateway RF transceiver may be compatible with and communication with RF transceivers of the edge gateways. Since the fog gateway RF transceiver is compatible with an RF transceiver of the edge gateway, the fog gateway 130 may be communicatively coupled via the fog gateway radio frequency transceiver to each of the edge gateways of the number of edge gateways 137. The number of edge gateways 137 may not, for example, have an indication of the geographical location of the space. For example, the respective edge gateway may not know if it is located in Miami or Boise. However, the fog gateway 130 may have the geographical location of the edge gateway in addition to the location of the edge gateway within the space, stored in the fog gateway's memory. The fog gateway 130 may also be communicatively coupled to an internet of things (IoT) hub 190. The IoT hub 190 may enable connectivity of the system 100 to other networks, such as cellular networks, wide area data networks or the like. As an alternative to storing the geographical location information regarding the number of edge gateways 137, the fog gateway 130 may access a server application in the cloud via the IOT hub/cloud 190 to obtain the geographical locations of the respective edge gateways 137 in the space. The cloud 190 may be used to store information for multiple spaces, such as the geographical location of the edge gateways and/or spaces, the locations of the respective edge gateways and nodes in respective spaces throughout a country or geographical region.

As outlined above, the asset tracking tags 120 operate with the system 100 having wireless network of RF-enabled nodes 133 and a number of edge gateways 137, it may be helpful next to consider a simple system configuration for use in a further discussion of an operational example.

Figure 2B:
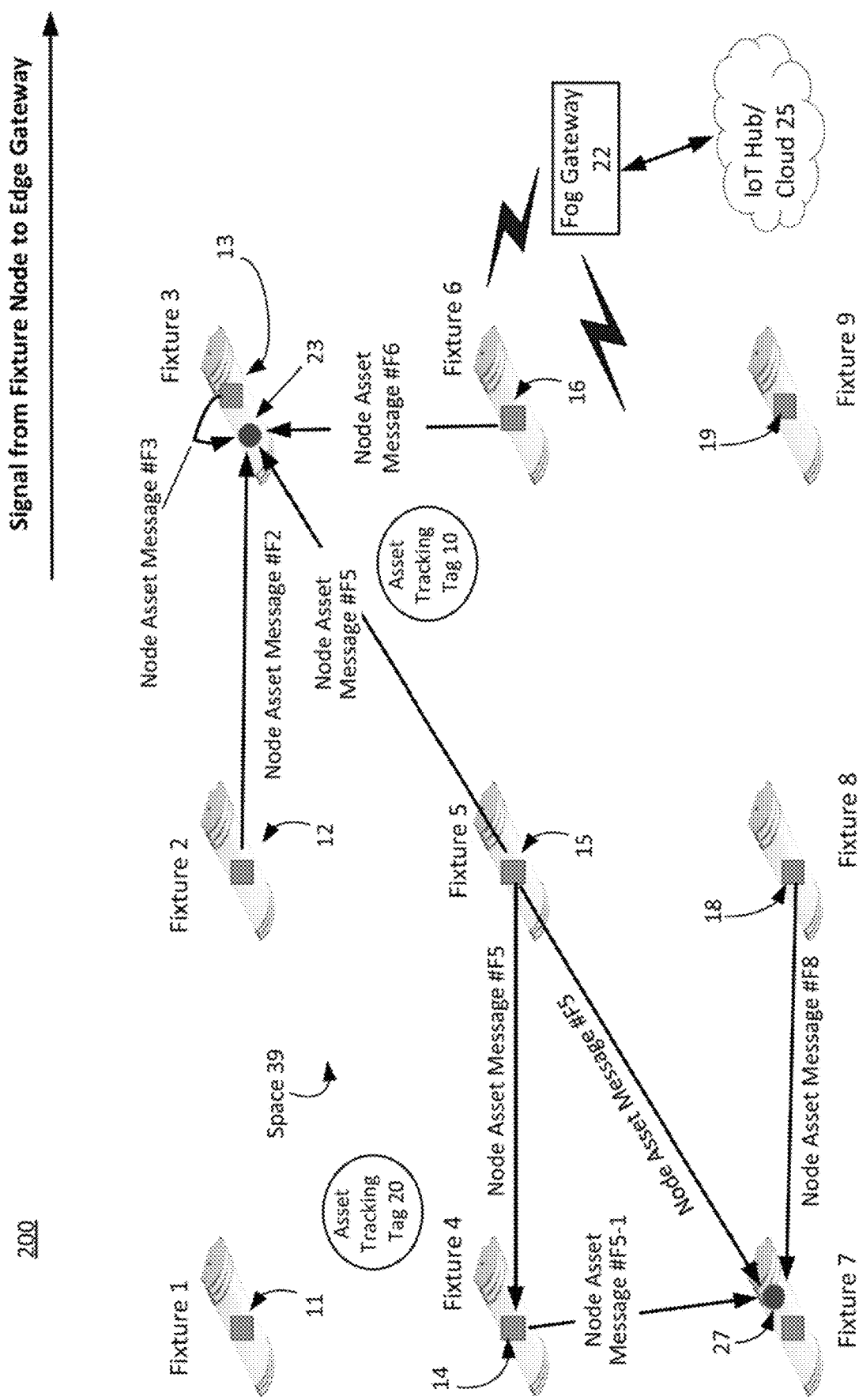
Figure 2C:
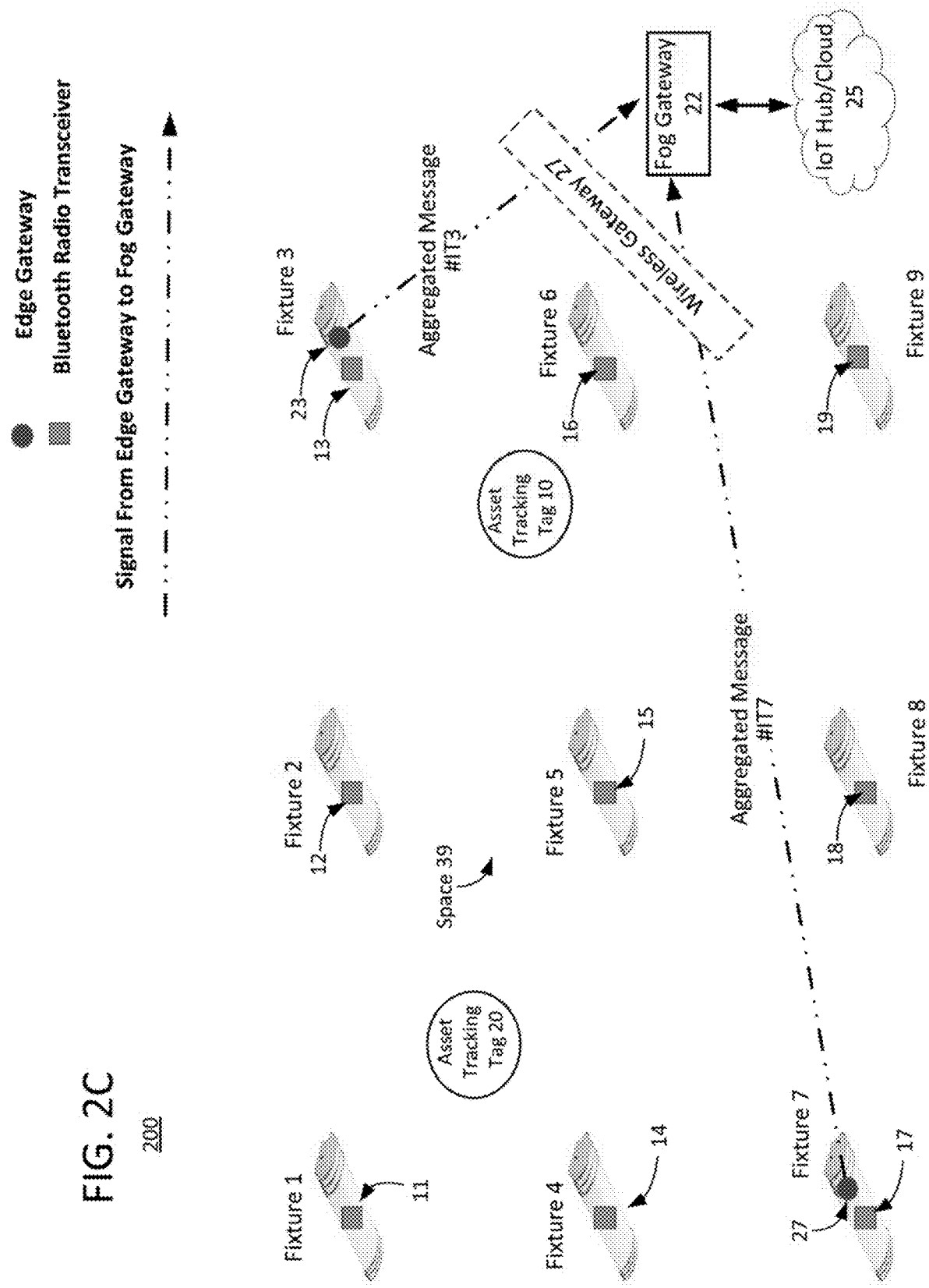

FIGS. 2A, 2B and 2C depict a simplistic system example of the functions performed by each of the system components, such as those described with reference to FIG. 1.

Similar to system 100, the simplistic system 200 of FIG. 2A includes a number of RF-enabled nodes implemented in light fixtures 1-9, a number of edge gateways 23 and 17 in light fixtures 3 and 7 respectively, and a fog gateway 22.

The several light fixtures 1-9 of the system 200 are arranged to provide general illumination within space 39, and are configured as RF-enabled wireless communication nodes in a network, such as 133 of FIG. 1. In the example, two of the light fixtures 3 and 7 also are configured as edge gateways. Each of the several fixtures 1-9 has a node controller 11-19, respectively. The respective node controllers 11-19 are configured to manage nodal communications with the edge gateways 23, 27 and the controller 22 of system 200. The respective node controllers 11-19 are also configured to communicate with the asset tracking tags 10 and 20. In a light fixture like 3 or 7 that also functions as an edge gateway, the node controller may also control gateway related operations, e.g. receiving messages from nodes and transmitting messages to the fog gateway. The node controller 12 of light fixture 2 is shown in detail and is representative of the other node controllers 11 and 13-19. The node controller 12 may be coupled to a light source (LS) 92 that provides illumination to the space 39.

Some light fixtures serving only as an end nodal devices may have only a single radio frequency (RF) type wireless transceiver for the first frequency band and/or protocol;

however, at least those light fixtures serving as edge gateways have transceiver systems for two bands and/or protocols, typically two RF wireless transceivers for the first and second bands and/or protocols. In some later examples, each RF network enabled light fixture has both a first transceiver (e.g. a Bluetooth low energy radio) and a second transceiver (e.g. a WiFi or sub-GHz radio), although some may serve as end nodes and only use the first type transceiver. In other examples, some light fixtures in an RF network may only have the first radio frequency transceiver while others comprise systems with both types of radio transceivers for the edge gateway functionality. In still further examples, some fixtures may have one or the other radio while some number of other fixtures may have a combination of the two RF transceiver types, (e.g. some nodes have Bluetooth only, some have WiFi or Sub-GHz only, and edge gateways have both).

The node controller 12 may include a processor 62, at least one radio frequency transceiver (RF Xcvr) or transceiver system 72, and a memory 82. The memory 82 may include programming code that when executed by the processor configures the processor 62 to perform various functions. For example, memory 82 may store node programming 284 that when executed configures the node controller 12 of fixture 2 to perform functions typically performed by nodes in the network of RF-enabled wireless communication nodes. One purpose of the node is to deliver data, including data obtained from received basic messages, to an edge gateway via a first frequency band and/or protocol. Such node network functions are described in more detail below. In addition or alternatively, the memory 82 may store edge gateway programming 286. The edge gateway programming 286 that when executed configures the node controller 12 to perform functions associated with an edge gateway 26 or 27. The edge gateways 26 or 27 may serve to translate messages received from node controllers 11-19 into communications suitable for exchange with the fog controller 22. One purpose of the edge gateway is to deliver data, including aggregated message data obtained from the received node asset message messages, to and receive data from the fog gateway via a different frequency and/or protocol (e.g. WiFi or sub GHz PAN) to avoid interference/traffic from 2.4 GHz. In addition, sub GHz or WiFi radio frequency signals have a longer range than the 2.4 GHz signals (e.g. of BLE) to extend the coverage and distance between the edge gateways 26, 27 and the fog gateway 22. The functions of an edge gateway are described in more detail with reference to the example in FIGS. 2B, 2C, 3, 4A, 4B and other examples. The processor 62 may control the functions of the node within the network of RF-enabled wireless communication nodes.

Each of the light fixtures 1-9 may be assigned an identifier referred to as a node identifier in the network, and the node identifier may be stored in the respective memory of the respective node controller 11-19. For example, the node identifier of fixture 2 may be stored in the memory 82. Each light fixture processor, such as 62 of fixture 2, may, for example, be configured to control the light source (e.g. 92) and the RF transceiver (e.g., 72), and process signals and messages received from asset tracking tags, such as 10, within space 39, the edge gateways 23 and 27, and the fog gateway 22. For example, the node controller 12 may deliver control commands to the light source (LS) 92 of the light fixture and provide light source status information (e.g., temperature, ON duration and the like) to the fog gateway 22. Each radio frequency transceiver of respective node controllers 11-19 may be configured to receive and transmit signals within a first frequency band. For example, the radio frequency transceivers may be a Bluetooth transceiver, such as a Bluetooth Low Energy (BLE) transceiver that is configured to operate according to the Bluetooth communication protocol and transmit and receive RF signals at a frequency of approximately 2.4 GHz.

In the example of FIG. 2A, the RF transceivers of the respective light fixtures 1-9 may be configured to communicate with a RF transceiver of asset tracking tags, such as asset tracking tag 10, within the space 39.

As shown in FIGS. 2A-C, the edge gateways of the system 200 may be collocated with one or more lighting fixtures in the space 39. For example, the edge gateways 23 and 27 are collocated with Fixture 3 and Fixture 7, respectively, of system 200. The edge gateways 27 and 23 may be configured to operate in the first frequency band compatible with the node radio frequency transceiver. For example, the edge gateways 23 and 27 may include a BLE transceiver that performs additional processing of signals received from the RF transceiver of a node controller, such as node controller 13 of fixture 3, but discards signals received from asset tracking tags 10 and 20. As an alternative to including the additional edge gateway programming 286, the edge gateway may be system-on-a-chip (SOC) (described more with reference to the example of FIG. 7) that provides all of the components (e.g., processor, memory, RF transceiver) of an edge gateway and receives power from a component of the light fixture such as a driver of the light source or the like. For example, using the edge gateway SOC configuration, nearly any of fixtures 1, 2, 4-6, 8 or 9 may also be configured to provide the edge gateway functions in addition to fixtures 3 and 7 that may be programmed or are already configured as edge gateways.

The fog gateway 22 may be configured for wireless data communication with the edge gateways 27 and 23. For example, the fog gateway 22 may be configured with a radio frequency transceiver (not shown in this example) that is compatible with the radio frequency transceiver in any of the light fixtures 1-9 that utilizes the second frequency band and/or protocol.

In an alternative example, the edge gateways 23 and 27 may be equipped with a first RF transceiver system (e.g. one or more transceivers) configured to transmit and receive signals of a first frequency band and configured to receive and transmit signals in a second frequency band different from the first frequency band. For example, a first RF transceiver may be one of a Bluetooth transceiver, a Zigbee transceiver, a radio frequency identifier (RFID) transceiver, or a Wi-Fi transceiver. The first RF transceiver may also be configured to operate within a first frequency band that may include 2.4 GHz or the like. At least in the edge gateways, the transceiver system may have a second transceiver configured to receive and transmit signals in the second frequency band, which may be in the sub-GHz range, such as, for example, 900 MHz or the like. In some examples, the first RF transceiver is a Bluetooth Low Energy (BLE) transceiver and the second transceiver is a 900 MHz personal area network (PAN) protocol type transceiver, although a WiFi or other transceiver may be utilized as the second transceiver. Depending on the type of WiFi, e.g. 2G or 5G, the WiFi second frequency band may overlap with the BLE first frequency band. For example, Bluetooth signals use frequencies between 2.4000 GHz and 2.4836 GHz (the "2.4 GHz band"), while some iterations of WiFi communicate broadcast signals using frequencies in three 22-MHz-wide sub-bands spaced out within the 2.4 GHz band (2G protocol), which results in some overlap. Other iterations of the WiFi protocol call for operation in a 5 GHZ (or 5G) band ranging from 5.725 GHz to 5.875 GHz, which would be totally separate from the 2.4 GHz band used by Bluetooth.

In FIG. 2A, the asset tracking tag 10 is shown transmitting a basic message. The basic message may include an identifier of the asset tracking tag and a basic message sequence number. The asset tag identifier (ID) in the basic message may be, for example, a 6 byte asset tag ID that is unique to asset tracking tag 10, at least with respect to tags used for tracking in the space 39. In one example, however, the asset tag identifier (ID) may be a media access control (MAC) address of the BLE transceiver, which may be guaranteed to be globally unique by the BLE chip vendor. In a specific example, the basic message sequence number may be, for example, a 4 byte sequence number, which ensures that the sequence number will not repeat for a number of years. The number of years until a sequence number repeats is estimated to be almost 450 years.

The asset tracking tag 10 located in space 39 may transmit the basic message into the space 39 in response to an event or stimulus detected by the asset tracking tag 10. For example, an event may be a change of a counter value to a predetermined value, a timing event, receipt of an input signal from an external source, or the like. A detected stimulus may be, for example, a specific temperature, a movement, a noise above a certain level or for a predetermined duration, ambient light above a certain level, receipt of a particular signal or message from an RF enabled node, or the like.

The asset tracking tag 10 transmits the basic message into the space 39 without any intended recipient. In this respect, the transmitted basic message may be viewed as a beacon signal meant to inform any of light fixtures 1-9 in the space of the identity of the asset tracking tag 10 and to provide an associated basic message sequence number. For ease of discussion and illustration, only one basic message is shown in FIG. 2A being transmitted by the asset tracking tag 10. However, it is envisioned that in some examples the asset tracking tag 10 may transmit a basic message approximately every 250-300 milliseconds (ms), or at a preset counter value, such as 10,000 or the like. Whenever the asset tag 10 transmits a basic message, the basic message sequence number of the transmitted basic message is incremented from the previous basic message sequence number in the basic message transmitted immediately prior to the latest transmitted basic message. For example, at counter value C=12000, asset tracking tag 10 may send a basic message with its tag ID (e.g. XYZ) and sequence number (e.g., 100), and, at counter value C=24000, asset tracking tag 10 may send a basic message with its tag ID XYZ and a incremented sequence number, such as 101. For convenience in this simple example, the asset tracking tag 20 is not transmitting any basic messages or other signals at this time.

Returning to FIG. 2A, the basic message transmitted by the asset tracking tag 10 may be received at three or more of the wireless communications nodes is distributed about the space 39. In the example of FIG. 2A, lighting fixtures 2, 3, 5, 6 and 8 of the light fixtures 1-9 receive the basic message transmitted by the asset tracking tag 10. RF transceivers (e.g. of the first type) in the lighting fixtures 1-9 may be configured to each measure a signal attribute of any received basic message, which in this example is the message transmitted by the asset tracking tag 10. In this example, each of the three or more wireless communication nodes (i.e., lighting fixtures 2, 3, 5, and 8) measure a signal attribute to the received basic message. A signal attribute of the received signal may include the received signal strength (RSS), angle of arrival (AoA), or the like. For purposes of discussion of a particular example, the received signal strength (RSS) may be measured and indicated by a value referred to as the received signal strength indicator (RSSI). Each of the RF transceivers in the RF-enabled nodes 11-19 in such an example may be configured to output an RSSI corresponding to any received basic message signal to the light fixture processor (not shown in this example). The light fixture processor may control the light source and the light fixture RF transceiver, and may be configured to process the basic message signals received from the asset tracking tag 10 as well as the RSSI values output by the RF transceiver in the particular node.

In the examples of FIGS. 2A-2C, the light fixtures 1-9 form a network of RF-enabled wireless communication nodes, such as network 133 of FIG. 1. In a specific example, the network formed from light fixture 1-9 nodes may be referred to as a flooding network. Messages in the flooding network topology have a time to live (TTL). The TTL may be a set period of time, a set number of hops, or the like. The TTL may also be a configuration setting of how individual nodes are supposed to respond in response to receiving a message. For example, a node processor may be configured to upon receipt of a message to lookup in a memory an identifier of the message, such as a tag ID and basic message sequence number. If the message identifier has been received previously, the node may discard the received message. Alternatively, if the node does not have the message identifier stored in memory, the node processor stores the message identifier and may send a node specific message to the RF transceiver of the node for transmission into the space 39.

A more detailed example of TTL settings is described in more detail with reference to FIG. 2B and the messaging of light fixture 5. The node specific message in the example of 2B is referred to as a node asset message, but under different conditions, the node specific message may be a message different from the node asset message. A node asset message is generated in response to receipt of a basic message. The node asset message may include, for example, the tag ID and the basic message sequence number and additional information related to the particular RF enabled node and the received basic message. In a specific example, the node asset message may include the asset tracking tag identifier, and the basic message sequence number as well as the node identifier of the RF-enabled node that received the basic message and is transmitting the corresponding node asset message. The node asset message in the example also includes the measured signal attribute value of the basic message as measured by the identified RF-enabled node. An example of the node identifier may be an identifier associated with the RF transceiver, an identifier associated with the light fixture when commissioned in the network, or another identifier assigned to the particular node or light fixture.

After the node asset message is generated by the respective light fixture processor at the respective fixtures 2, 3, 5 and 8, the light fixture processor causes the RF transceiver of the respective light fixture transmits the node asset message into the space 39.

In FIG. 2B, the fixtures 2, 3, 5 and 8 that received the basic message from asset tracking tag 10 may begin processing the basic message. For example, the respective light fixture RF transceivers 12, 13, 15 and 18 may measure a respective signal attribute of the received basic message. For example, each of the light fixture RF transceivers 12, 13, 15 and 18 may measure, for example, a RSSI of the signal transmitting the basic message. After measuring the RSSI, the respective RF transceivers of the node controllers 12, 13, 15 and 18 forwards the measured RSSI values to their respective processors of the respective node controllers. In other words, RF transceiver 72 of node controller 12 forwards the measured RSSI to the processor 62. The processor 62 may generate a node asset message unique for fixture 2. Fixture 2's node asset message may include the RSSI value of the received basic message as measured by the RF transceiver 72 of the controller at RF-enabled node 12, the node identifier of fixture 2, and the information in the basic message (i.e. asset tracking tag identifier and basic message sequence number) sent by the asset tracking tag 10. The node controller 12 of fixture 2 may transmit the generated node asset message, Node Asset Message #F2, into the space 39 via transceiver 72 for eventual delivery to an edge gateway, such as 23 or 27. While the node asset message is transmitted for delivery to any edge gateway, in this example, the RF-enabled node 12 is within in the coverage area of edge gateway 23. Hence, the Node Asset Message #F2 is delivered to the edge gateway 23.

Similarly, the respective RF transceivers and processors of node controllers 13, 16 and 18 in fixtures 3, 6 and 8, respectively, may perform similar functions as those described above with reference to node controller 12 of fixture 2. For example, all of the other fixtures that receive the basic message from asset tracking tag 10, such as fixtures 3, 5, 6 and 8 also perform the same described measuring of the received signal strength, generation of a unique node asset message, and transmitting of a respective node asset message.

For example, node controller 16 of fixture 6 may generate and transmit Node Asset Message #F6 into space 39 for delivery to an edge gateway, such as 23 or 27 having a coverage area that includes RF-enabled node 16. However, in the example of FIG. 2B, the edge gateway 23 receives the node asset message #F6, while edge gateway 27 does not. Similar results may occur with the transmission of other generated node asset messages, such as, for example, Node Asset Message #F3 and Node Asset Message #F6.

None of the Node Asset Messages #F2, #F3, #F6 and #F8 are shown in FIG. 2B as being delivered to another fixture (i.e. node), but are instead shown as being directly respectively by the edge gateways 23 and 27. An alternate case is that of the node asset message generated by node controller 15 of fixture 5. In the case of node asset message #F5 transmitted by Fixture 5, the node controller 15 causes the node asset message #F5 to be transmitted into space 39. The node asset message #F5 transmitted into space 39 may be, as may the other transmitted node asset messages, received by other fixtures in the system 200. The other fixtures, such as fixture 4 in the example of FIG. 2B, may receive the node asset message #F5. Similar to the manner explained above for the flooding network, fixture 4 receives the node asset message #F5 and the node controller 14 may begin processing the received node asset message #F5 to determine if it had been previously received at fixture 4. Since the received node asset message #F5 was not received previously by fixture 4, the node controller 14 optionally could be configured to retransmit node asset message #F5 as shown by the transmission of node asset message #F5-1 by fixture 4. For example, fixture 4 may process the node asset message #F5 by determining whether the received node asset message includes a node identifier (NID) and/or an RSSI. If the received node asset message includes a NID and has not been previously received by fixture 4, fixture 4 may forward the received node asset message without any modification. Alternatively, if the received message does not include a NID, fixture 4 may determine the message is a basic message transmitted by an asset tracking tag, and generate its own node asset message by appending to the received basic message the NID for RF-enabled node 14 and the measured RSSI value determined at that node.

The node asset message #F5-1 retransmitted from fixture 4 includes all of the same information as node asset message #F5 that was originally transmitted by fixture 5, and is received by the edge gateway 27.

In addition to node asset message #F5 being received at Fixture 4, the node asset message #F5 that was transmitted by fixture 5 is also received by the edge gateway 27 collocated with fixture 7. Edge gateway 27 also receives node asset message #F8 from fixture 8.

Each of the edge gateways 23 and 27 may be configured to perform a function or functions in response to receiving the node asset messages. For example, each edge gateway 23 and 27 may be configured to collect from the received node asset messages that include the same asset tracking tag ID and the same basic message sequence number. Each edge gateway consolidates all of the collected message data by evaluating the signal attribute measurements contained in each of the collected basic messages, and generating an aggregated message containing three node identifiers and RSSI values for signal strengths measured at the nodes indicated by the three selected node identifiers. The edge gateways 23 and 27 may perform a function that reduces any duplicate node asset messages. For example, node asset message #F5 and node asset message #F5-1 are redundant or duplicative. So the information in one of the node asset message #F5 or #F5-1 may be deleted by the edge gateway 27.

As shown in FIG. 2C, the respective edge gateways 23 and 27 transmit aggregated messages, such as aggregated message #IT3 and aggregated message #IT7, respectively, to the fog gateway 22. The fog gateway 22 may be configured to receive a respective aggregated messages, such as #IT3 and #IT7 from each of the edge gateways 23 and 27. Based on the list of the ranked node identifiers (NIDS) in the respective aggregated messages #IT3 and #IT7, the fog gateway 22 may form a node identifier tuple for use in obtaining an estimate of the location of the asset tracking tag within the space.

Figure 3:
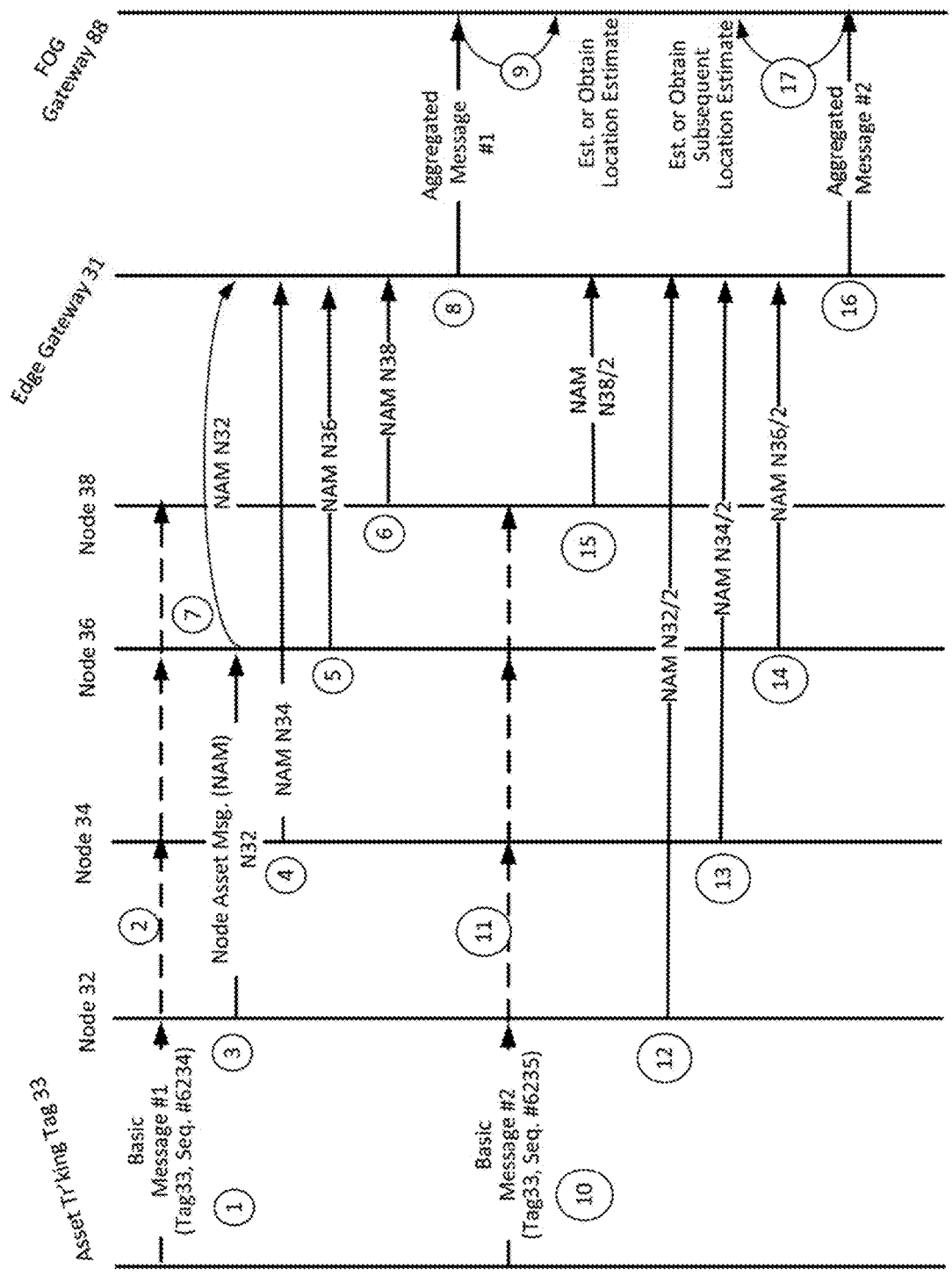
FIG. 3 is a flow diagram illustrating an example of message flow in an asset tracking and location estimate system, such as the examples described with reference to FIGS. 1 to 2C.

FIG. 3 is a flow diagram illustrating an example of message flow in an asset tracking and location estimate system, such as the examples described with reference to FIGS. 1-2C.

The example system implementing the process/signal flow of FIG. 3 includes asset tag 33, RF-enabled nodes 32, 24, 26 and 38, edge gateway (AI) 31, and fog gateway 88. The flow diagram of FIG. 3 differs from the examples in FIGS. 2A-2C in that the asset tracking tag is sending a first basic message (basic message #1) and a subsequent basic message (basic message #2). Although not shown, one or more similar process flows may be performed substantially at the same time but via one or more additional edge gateways.

At instance 1, the asset tracking tag 33 may transmit via a RF transceiver coupled to asset tracking tag 33 a signal containing basic message #1 in response to an event, such as detection of movement, based on a particular count of a counter or the like. Basic message #1 may contain the tag ID of asset tracking tag 33, which is shown as Tag33, and a message sequence number, such as 6234. The basic message #1 is transmitted into the space being monitored for the provision of the asset tracking and/or asset tag location estimation process. RF-enabled nodes 32, 34 36 and 38, as shown at instance 2, may receive the transmitted basic message #1. Similar to the discussion above with respect to FIG. 2B, each of nodes 32, 34 36 and 38 may measure a signal attribute of the received basic message #1. The measured signal attribute may be, for example, an RSSI value, angle of arrival or other signal attribute. The respective nodes 32, 34 and 36 may each generate a respective node asset message. Each respective node asset message contains the node identifier (NID) of the respective RF-enabled node, the identifier of the asset tag 33, the measured signal attribute as measured at the RF-enabled node and any additional information included in the basic message #1 transmitted by asset tracking tag 33.

At instances 3, 4, 5 and 6, the respective nodes 32, 34, 36 and 38 transmit the node asset messages (NAM) that the respective nodes generated (e.g. NAM N32 by node 32, NAM N34 by node 34, NAM N36 by node 36, and NAM N38 by node 38). Note that message NAM N32 is shown arriving at node 36. Node 36 may receive the NAM N32 transmitted by node 32. In a flooding network configuration in which the node 34 is within the radio coverage area of another edge gateway, it may be expected that the NAM N32 will be received by that other edge gateway; I which case, the RF enabled node 36 may just ignore the NAM N32 asset message from RF enabled node 34. Alternatively, RF enabled node 36 upon receipt of the NAM N32 may perform a process such as the process performed by fixture 4 upon receipt of the NAM #F5 from fixture 5. Node 36 after determining the NAM N32 is to be forwarded without appending any additional information, retransmits NAM N32 at instance 7 to the edge gateway 31. In contrast, the NAM messages transmitted by nodes 34, 36 and 38 are received directly by edge gateway 31.

Figure 4A:
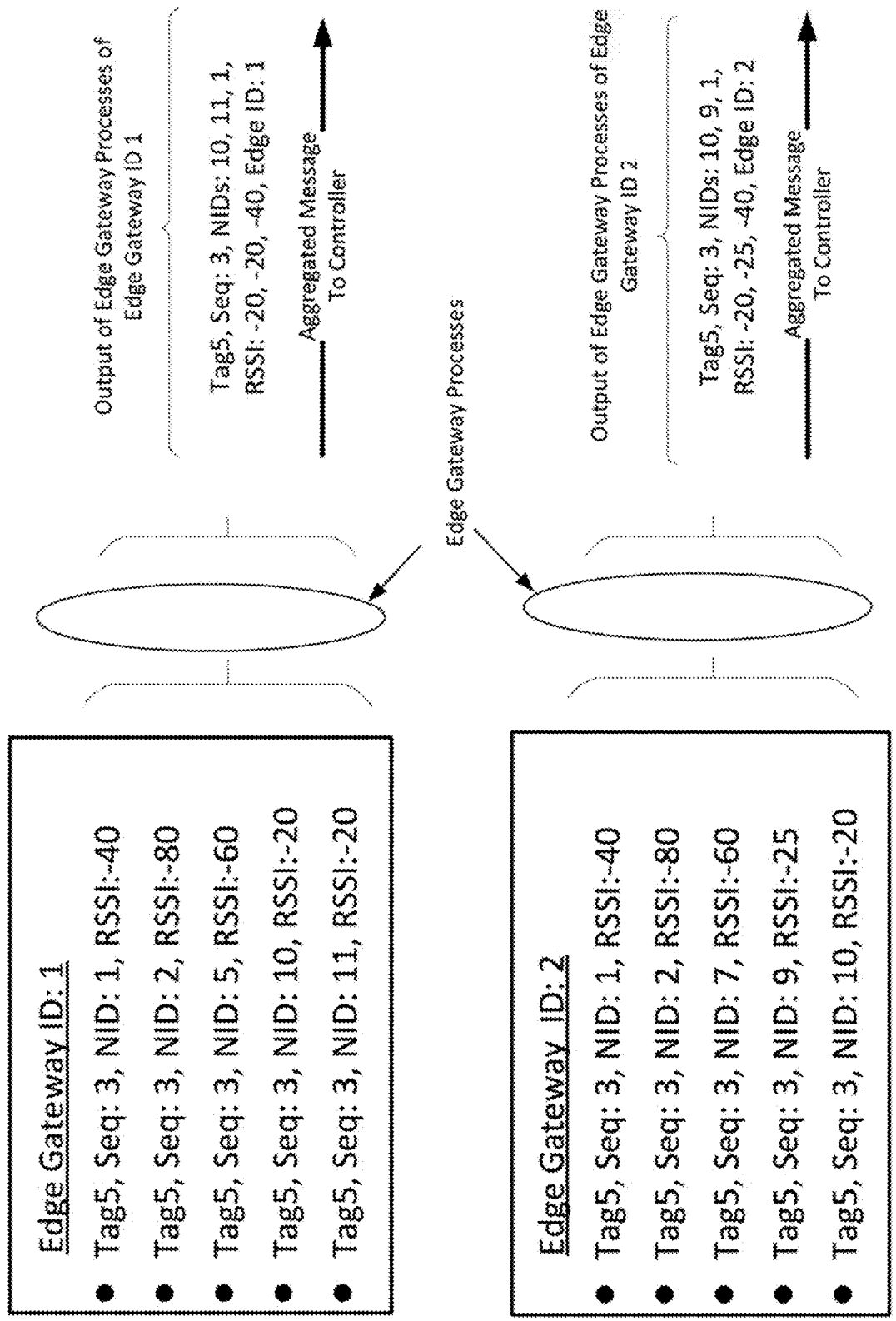

The edge gateway 31 processes (according to the processes described in more detail with respect to the examples of FIGS. 4A and 4B) the received NAMs. Using the information in the received NAMs, the edge gateway 31 generates an aggregated message #1 using a process such as that described in the example of FIG. 2C. As explained with reference to FIGS. 4A and 4B, the aggregated message may contain the node identifiers and the ranking of the respective node identifiers and the respective measured signal attributes. Although not shown in FIG. 3, the fog gateway 88 receives a similar aggregated message from each of one or more other edge gateways. The fog gateway 88 at instance 9 may use the information in the aggregated message #1 and other received aggregated messages, to estimate, or obtain an estimate of, a location of the asset tracking tag 33. As described in more detailed later with regard to FIGS. 8A to 11, the fog gateway 88 parses data from the aggregated messages to form a node identifier tuple identifying at least three nodes near the asset tag. Ordered identifiers from the tuple and known locations of the identified nearby nodes can then be processed to estimate of the location of the asset tracking tag 33.

Subsequent to transmitting the basic message #1, the asset tracking tag 33 may generate and transmit a subsequent basic message at instance 10. For example, basic message #2 may be generated by the asset tracking tag 33 and contain the asset tracking tag identifier Tag33 and a subsequent sequence number 6235. The transmitted basic message, at instance 11, is received at nodes 32, 34, 36 and 38. The nodes 32, 34, 36 and 38 each perform the same process of measuring a respective signal attribute of the received basic message #2, and generating a NAM for transmission to an edge gateway 31. The respective nodes 32, 34, 36 and 38 reach transmit a NAM (e.g. NAM N32/2 by node 32 at instance 12, NAM N34/2 by node 34 at instance 13, NAM N36/2 by node 36 at instance 14, and NAM N38/2 by node 38 at instance 15). The edge gateway 31 receives each of these messages at instance 16, and begins processing the respective messages and generates aggregated message #2 (according to a process described in more detail with reference to the examples of FIGS. 4A and 4B). Aggregated message #2 is transmitted by the edge gateway 31 to the fog gateway 88.

The fog gateway 88 receives subsequent aggregated message #2. The received subsequent aggregated message may include the asset tracking tag identifier (e.g. Tag33), a basic message sequence number (Seq. #6235—that is different from the sequence number of basic message #1), and a subsequent list of node identifiers ranked based on a value of the measured signal attribute of the basic message #2 included in each respective node asset message. Although not shown in FIG. 3, the fog gateway 88 receives a similar aggregated message from each of one or more other edge gateways. The fog gateway 88 may estimate, or obtain an estimate of, a subsequent location of the asset tracking tag using the node identifiers and the ranking of the respective node identifiers in the second set of aggregated messages to estimate the subsequent location of the asset tracking tag within the space. As described in more detailed later with regard to FIGS. 8A to 11, the fog gateway 88 parses data from the aggregated messages to form a node identifier tuple identifying at least three nodes near the asset tag. Ordered identifiers from the tuple and known locations of the identified nearby nodes can then be processed to estimate of the location of the asset tracking tag 33. The estimated subsequent location may be the same as, or different from, as the preceding location.

While only one edge gateway 31 is shown in the example of FIG. 3, there may be multiple edge gateways, such as 26 and 27, that receive basic messages from the respective nodes 32, 34, 36 and 38. Each of the multiple edge gateways may transmit an aggregated message to the fog gateway 88. As a result, the fog gateway 88 may receive multiple aggregated messages that may include redundant or duplicate basic message information. Part of the processing to form each tuple eliminates any redundant or duplicate information.

The edge gateway functions are now described in more detail with reference to the examples shown in FIGS. 4A and 4B. FIG. 4A shows a pair of edge gateways (ID: 1 and ID: 2) and examples of the node asset messages (shown by the bullet points) received by the respective edge gateways. Recall that the node asset messages are based on basic messages transmitted by an asset tracking tag, such as asset tracking tag 10. For ease of discussion and illustration, each edge gateway is shown as receiving five (5) node asset messages. Of course, more or fewer node asset messages may be transmitted by a respective RF-enabled node and more or fewer transmitted node asset messages may be received by any one of the edge gateways.

In the example of FIG. 4A, the edge gateway ID 1 received respective transmitted node asset messages from three or more RF-enabled wireless communication nodes within a network, such as 133. For example, edge gateway ID 1 received node asset messages from RF-enabled nodes with respective node identifiers (NID): 1, 2, 5, 11 and 10. The edge gateway ID 2 received node asset messages from RF-enabled nodes within a network, such as 133, having respective node identifiers (NID): 1, 2, 7, 11 and 10.

As shown in FIG. 4A, each edge gateway may perform edge gateway processes to reduce the number of received node asset messages for aggregation, to a number that may be efficiently transmitted in an aggregated message and used to perform an estimate of the location of the asset tracking tag when the basic message was transmitted. In an example of reducing the number of node asset messages, each of the edge gateways may wait period to time, such as 250-300 ms or the like, before generating and transmitting an aggregated message to the fog gateway. During the waiting period, the edge gateway may eliminate duplicate received messages based on RSSI, tag identifier and the basic message sequence number.

For example, edge gateway ID 1 may be configured to evaluate the received node asset messages according to the tag ID such as Tag5. Upon grouping all of the received node asset messages based on the tag ID: Tag5, the edge gateway ID 1 may further parse the grouped node asset messages using the basic message sequence number, such as basic message sequence number 3, labeled as "Seq: 3" in FIG. 4A. Each edge gateway ID 1 or ID 2 may be configured to further parse the received node asset messages already parsed based on tag ID and basic message sequence number according to the measured signal attribute. For example, an edge gateway may further parse the data already parsed somewhat from the received node asset messages by selecting node identifiers for nodes having provided the top three or five measure values or by selecting node identifiers for nodes having provided measure values above a set or computed (e.g. rolling average) threshold value. Parsing according to the measured signal attribute may also include discarding respective node asset messages from the received node asset messages that have a measured signal attribute value and node ID that are duplicates of another received node asset message. In a more detailed example, recall in the example of FIG. 2B in which fixture 4 forwards node asset message #F5-1 to edge gateway 27 and fixture 5 transmits node asset message #F5, the information in node asset message #F5-1 may be a duplicate of the information in node asset message #F5. The processor of edge gateway 27 may have a time or counter and may be able to distinguish which of node asset messages #F5 and #F5-1 was received first, and the later received message may be discarded as a duplicate. Of course, other processes for discarding duplicate received messages may also be used. Each edge gateway ID 1 or ID 2 may continue to analyze the node asset messages for discarding additional duplicates.

Upon removal of all duplicates, the edge gateway ID 1 may continue processing the node asset messages by identifying the respective node identifiers (NID) extracted from the received node asset messages transmitted by the three or more wireless communication nodes having the highest measured signal attributes. For example, the edge gateway ID 1 may be configured to insert the NIDs in an aggregated message based on top three (or some other number) highest measured signal attributes. For example, a RSSI: −20 is higher ranking than a RSSI: −80 because a RSSI: −20 indicates a stronger signal than the RSSI: −80. In the specific example of edge gateway ID: 1, after identifying the highest measured signal attributes for use in determining which RF-enabled nodes are nearest to the asset tracking tag, those entries not identified may be discarded, and an aggregated message may be generated. For example, the output of the edge gateway processed of edge gateway ID 1, may be asset tracking tag ID (Tag 5), basic message sequence number (Seq.: 3), node identifiers—NIDS (10, 11 and 1), the three remaining highest measured signal attributes (e.g. RSSI values) in any order): −20, −20 and −40.

The edge gateway ID 1 may be configured to generate an aggregated message that includes the remaining node asset messages associated with the highest measured signal attributes. The edge gateway ID 1 or ID 2 may include its respective edge gateway identifier (e.g. 1 or 2) in the generated aggregated message. The edge gateway ID 1 may forward the aggregated message to the fog gateway of the space 39 for use in the process of obtaining an estimate of the location of the asset tracking tag, as described later relative to FIGS. 8A to 11.

Edge gateway ID 2 may perform a similar process as described above for edge gateway ID 1. For example, edge gateway ID 2 may collect a number of node asset messages, and may discard one of the duplicate node asset messages having the same asset tag identifier, basic message sequence number, a NID, and RSSI value received from NID 1 or NID 7. After evaluating the remaining node asset messages collected node asset messages, edge gateway ID 2 may identify a number of NIDS associated with node asset messages having the three highest RSSI values for use in determining which RF-enabled nodes as are nearest to the asset tracking tag that transmitted the node asset messages. The three highest RSSI values and the NIDS associated with the three highest RSSI values, and the respective asset tag identifier, and basic message sequence number may be used to generate an aggregated message that is transmitted to fog gateway 22 of the space 39. The data in the aggregated message from edge gateway ID 2 for use together with the data in the aggregated message from edge gateway ID 1 is used in the process of obtaining an estimate of the location of the asset tracking tag, as described later relative to FIGS. 8A to 11.

Each of the edge gateways, such as ID 1 and ID 2, may wait a period of time, such as 250-300 ms or a particular count, such as 10,000, 24,000 or the like, before transmitting a message to the fog gateway. During the waiting period, each edge gateway may eliminate duplicate received messages based on RSSI, tag identifier and the basic message sequence number.

As shown in FIG. 4B, the fog gateway 244 may include a processor 255, RF transceiver 266 and a memory 277. The fog gateway 244 may receive via the RF transceiver 266 the respective aggregated messages transmitted by the edge gateways ID 1 and ID 2. Using the information in the respective aggregated messages received from edge gateways ID 1 and ID 2, the processor 255 may determine which nodes had the three highest measured signal attributes in all of the aggregated messages. In the example of FIG. 4B, the processor 255 of the fog gateway 244 may perform a duplicate discarding operation. Discarding duplicate data and selection of identifiers of RF enabled nodes that reported the three highest measured signal attributes amongst all of the aggregated messages enables to fog gateway processor 255 to generate an ordered node identifier tuple (as represented by the function/application 257*a* in FIG. 4B).

As shown in FIG. 4B, two entries for NID 1 appear respectively in aggregated messages from both edge gateways ID 1 and 2, and each NID 1 entry has a measured signal attribute (i.e. RSSI in this example) of (−) 40. Therefore, one of the entries from either of edge gateways ID 1 or ID 2 may be discarded. When discarded, the processor 255 of the fog gateway 244 may continue to process the remaining entries to identify the three highest RSSIs and the NIDs associated with the three highest RSSIs. In the example, the tuple includes a NID list of node indenters for the nodes that reported the three highest measured signal attributes. The NIDs are ordered in the tuple based on relative measured values, e.g. highest-to-lowest 10, 11, 9 as shown in the column to the left or lowest-to-highest 9, 11, 10 as shown in the column to the right.

In the example of FIG. 4B, the optional location estimation functionality/application 257b may be executed by the processor 255 of the fog gateway 244 or the processor in another computer device (e.g. as a server application on a computer in the cloud) the identifiers and the order of the identifiers in the tuple. For example, using the three NIDs, the location estimation functionality/application 257b may be configured to access a look up table (in fog gateway memory 277 or another memory) that has the physical locations within the space of the RF-enabled nodes that have the respective NIDs. Using geometric techniques, discussed later relative to FIGS. 8A to 11, based on the known locations of the processor 255 may be able to estimate, the location estimation functionality/application 257b obtains an estimate of the location of the asset tracking tag when the basic message was transmitted.

The fog gateway processor 255 may use the data from the node identifier tuple and stored node location data from the fog gateway memory 277 to implement the location estimation functionality/application 257b. Alternatively, the fog gateway processor 255 may obtain a location estimate of the asset tracking tag based on the node identifier tuple form a location service that generates the actual asset tracking tag location estimate. For example, the fog gateway 244 may forward the node identifier tuple to an IoT hub, such as 190 of FIG. 1. The IoT hub may have access to a service that has the known locations of the RF-enabled nodes assigned the NIDs or may request access to known location information stored in the for gateway memory 277. Alternatively, the location information may be sent with the node identifier tuple to the IoT hub shown in the examples of FIGS. 1 and 2A-C.

Figure 5:
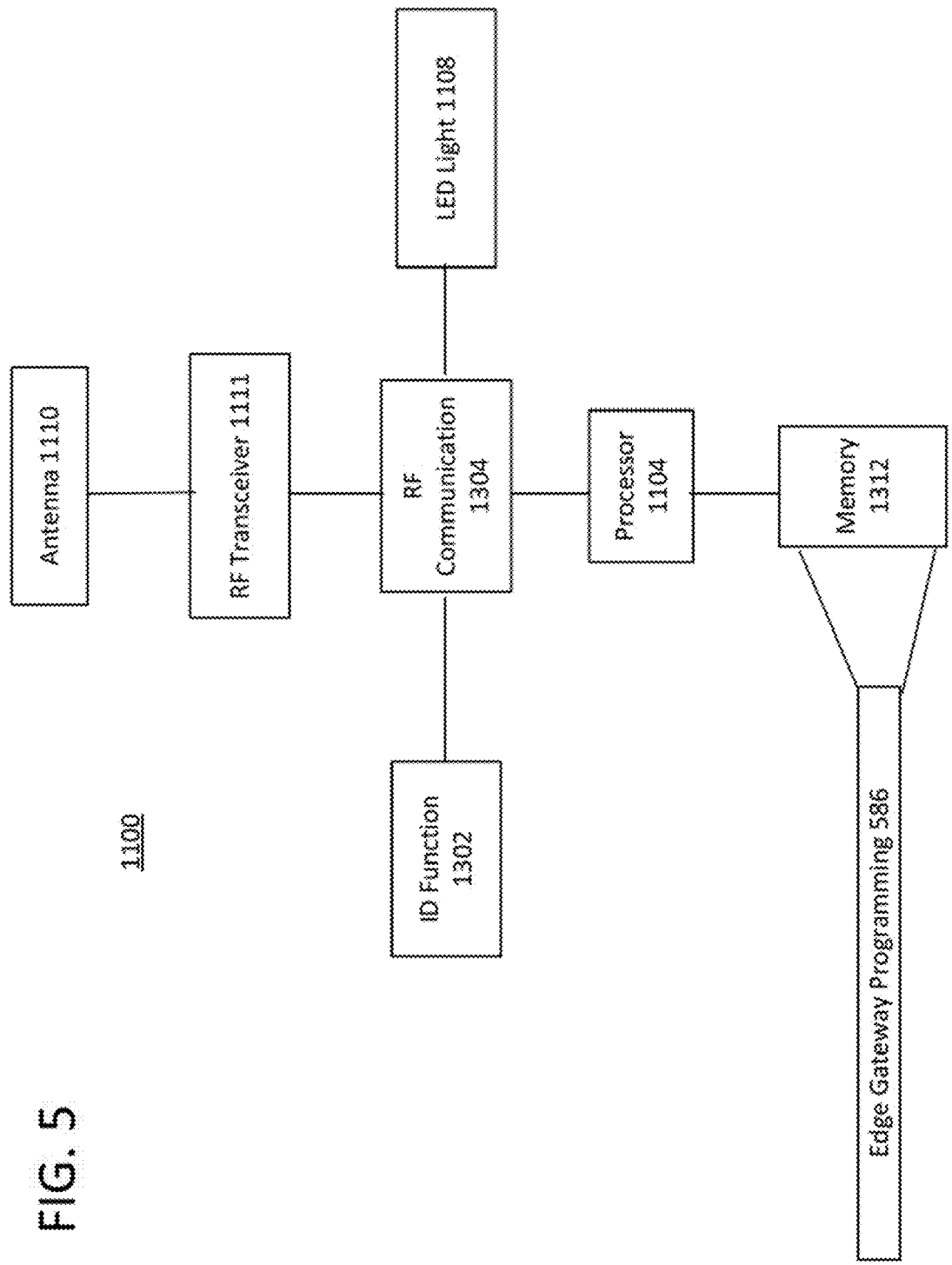
FIG. 5 depicts logical, functional, and structural features of a radio frequency communication enabled light fixture suitable for use as a node, e.g. in a network of RF-enabled wireless communication nodes.

The RF-enabled nodes of FIGS. 2A-2C are shown in light fixtures. FIG. 5 depicts logical, functional, and structural features of an example of a radio frequency wireless communication enabled light fixture 1100, suitable for use as an RF-enabled node in a network of RF-enabled wireless communication nodes. The light fixture 1100 may include a processor 1104, a memory 1312, an LED type light source 1108, an RF transceiver system 1111, an antenna 1110, and one or more sensors 1112. The light fixture 1100 may implement an ID function 1302 that may handle functionality related to determining the node identifier (NID) for a node asset message and/or a gateway identifier for an aggregated message if the fixture serves as a gateway. The light fixture 1100 may implement RF communication transceiver system features 1304 for communicating over the RF radio band(s) with RF-enabled asset tags and/or with other fixtures, such as fixture 4 of FIGS. 2A-2C, with edge gateways 26 and 27, with lighting system controllers (not shown), and/or with RF enabled asset tracking tags. The memory 1312 may be used for program storage (e.g. to implement processor control of the communication functions 1304), data storage, and the like. In an example, node or gateway ID data that may be used by ID function 1302 also may be stored in the memory 1312. In yet another example, data and other information received via the RF transceiver (TX/RX) 1111 may be stored in the memory 1312. The memory 1312 may store for example, basic messages received from asset tracking tags, lighting control information, asset tag information, time-to-live information of nodal communications, or the like.

An RF-enabled light fixture 1100, such as the one depicted in FIG. 5, may facilitate Bluetooth transmission and/or WiFi or sub-GHz for basic message processing, node asset message generation, aggregated message generation and other messaging as described herein. Communication and processing for location estimation is one particular example of an application for such an RF-enabled light fixture 1100.

In an example, RF communication between the RF capability of the light fixture 1100 and nearby asset tracking tags may facilitate enhanced location estimation of the asset tracking tag, as will be described herein. Another exemplary capability of the light fixture 1100, the asset tracking tags, edge gateways and fog gateway is bi-directional communication. Bi-directional RF communication allows the exchange of software updates, firmware updates, identifier updates, commissioning information, edge gateway location messages, edge gateway status messages, asset tracking tag status updates, lighting commands and the like to be received/transmitted, for example, from/to the fog gateway to the respective devices collocated with (e.g., edge gateways, light sources) or in communication with the light fixture 1100 (e.g., asset tracking tags or the like).

RF communication capabilities typically comply with some network-like standard, such as Bluetooth, sub-GHz PAN, WiFi, Zigbee or the like. As an example, a Bluetooth network standard includes unique identifiers for each Bluetooth device that is connected to a network. In a similar way, each RF enabled light fixture 1100 in the network may be configured with a unique node identifier (e.g. NID and/or a gateway ID). As explained above, the NIDs may be used when determining a position of an asset tracking tag within a space.

It is also envisioned that to further reduce network traffic and interference in some of the frequency bands used in the system, for example, the 2.4 GHz range commonly associated with Bluetooth, the edge gateway may be configured to utilize a different frequency band. For example, in addition to a 2.4 GHz radio frequency transceiver the edge gateway may be equipped with a different radio frequency transceiver, such as a sub-GHz radio frequency transceiver or a 5G WiFi transceiver. The fog gateway may also be configured with a sub-GHz RF transceiver or a 5G WiFi transceiver in order to facilitate communication with the edge gateways, such as 23 and 27 of FIGS. 2A-C.

In order to better explain this additional sub-GHz RF transceiver implementation by way of a two transceiver example, it may be helpful to refer back to FIG. 2B. In FIG. 2B, the transmitted node asset messages transmitted by the respective fixtures 2, 3, 5, 6, and 8 and retransmitted by fixture 4 for reception by the respective edge gateways 23 and 27 are transmitted in the 2.4 GHz frequency band typically associated with the Bluetooth standard. In FIG. 2C, the aggregated messages are transmitted by the edge gateways 23 and 27 to the fog gateway 22. These aggregated messages may also be transmitted in the 2.4 GHz frequency band typically associated with the Bluetooth standard or in sub-bands in the 2.4 GHz band using 2G WiFi. However, in this alternate example, the edge gateways 23 may be configured with a first radio frequency transceiver that operates in a first frequency band and a second radio frequency transceiver that operates in a second frequency band different from the first frequency band. The following discussion describes various implementations of an edge gateway configured with a first RF transceiver and a second RF transceiver.

Figure 6B:
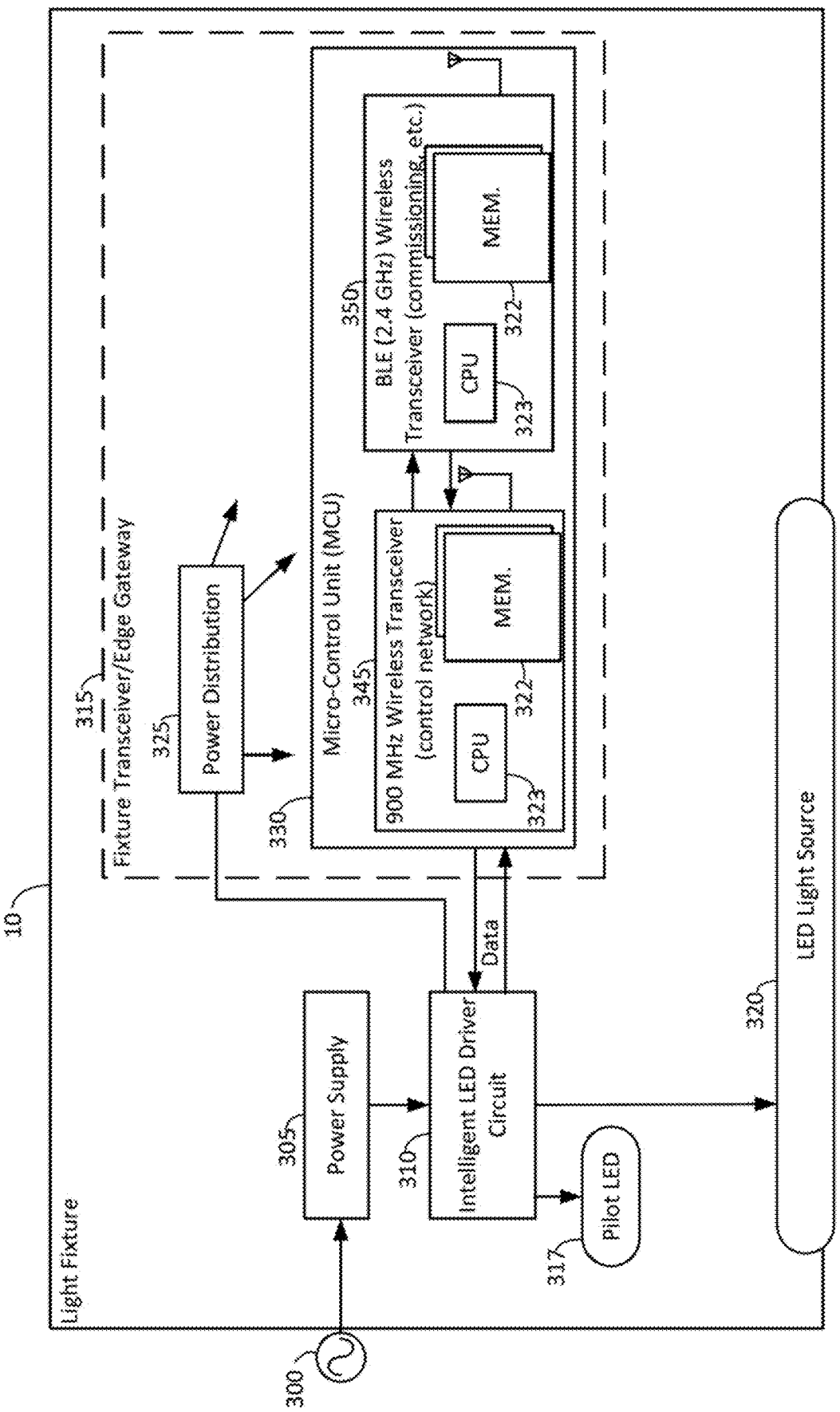
Figure 6C:
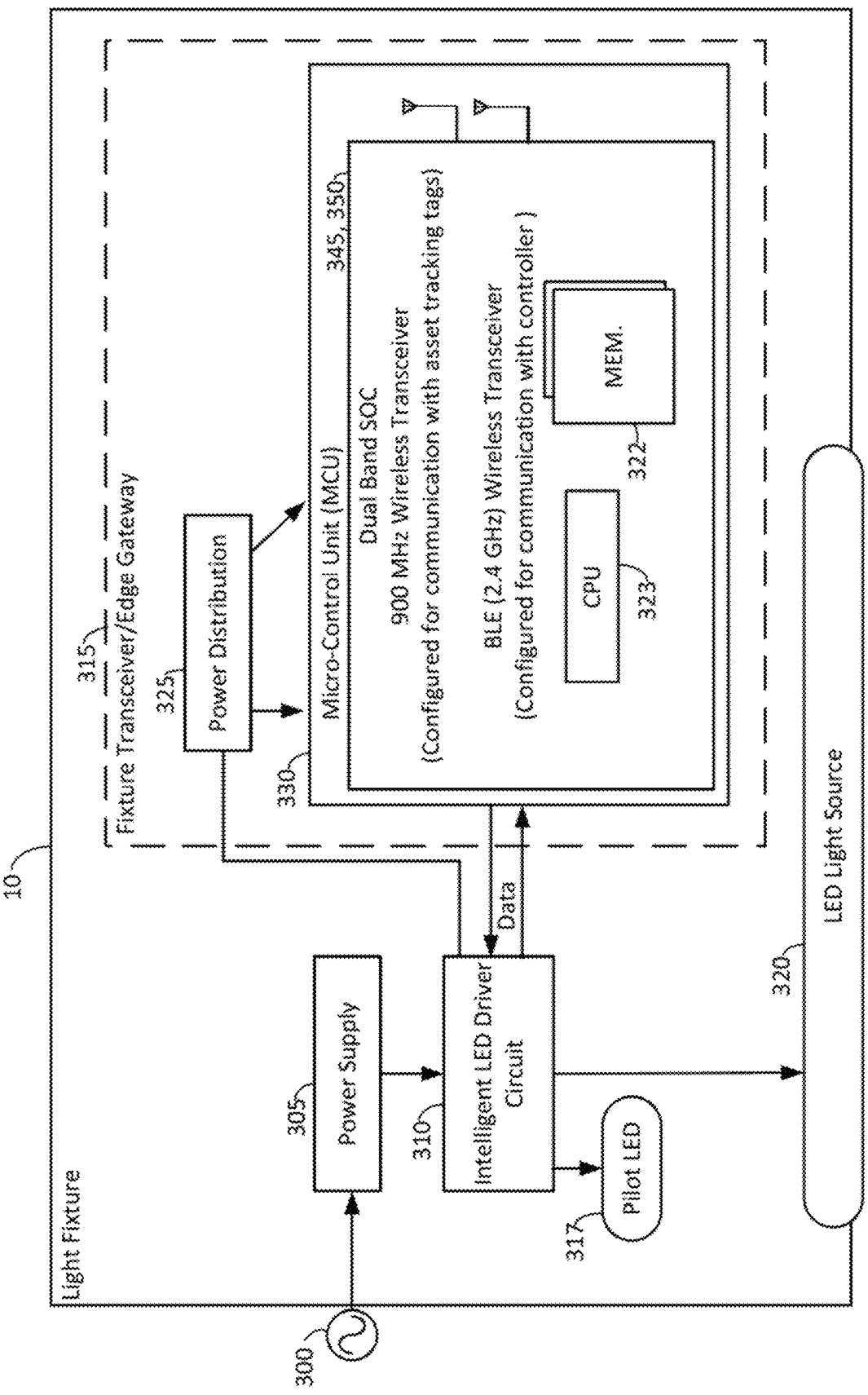

FIGS. 6A-C are block diagrams of different examples of a light fixture 10 that communicates as an RF-enabled node within the network of RF-enabled wireless communication nodes of FIG. 1. Each example of the light fixture 10 includes a variation of a radio frequency transceiver system configured to communicate via a first frequency band and a second frequency band, so that the light fixture may function as an edge gateway instead or in addition to functioning as an RF-enabled end node type device. For purposes of further discussion, however, it generally is assumed that the light fixture 10 is configured as an edge gateway unless there is specific reference to an end node function being performed at the fixture 10.

In all three examples, the light fixture 10 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for light fixture 10.

Light fixture 10 furthers include an intelligent LED driver circuit 310, fixture control/edge gateway 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured, for example, by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or an AC voltage. The pilot LED 317 indicates the state of the light fixture 10, for example, during commissioning and maintenance process. The example light fixture 10 is line powered and remains operational as long as power is available.

For purposes of communication and control, light fixture 10 may be treated as single addressable device by the fog gateway that can be configured to operate as a member of one or more lighting control groups or zones. For example, light fixture 10 that functions as an edge gateway may be strategically located to more likely receive node asset messages from a likely group of end nodal light fixtures not configured to operate as an edge gateway, such as fixtures 1, 4, 5, 7 and 8 of FIGS. 2B and 2C. Meanwhile, fixture 3 may be configured with an edge gateway, and be located to receive node asset messages from light fixtures 2, 3, 5 and 9 and communicate aggregated messages and other messages with the fog gateway. Of course, there may be some overlap between the likely radio coverage areas of the respective edge gateways 23 and 27. For example, edge gateways 23 and 27 may be equally likely to receive node asset messages from fixtures 1, 5 and 9.

Fixture control/edge gateway 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 includes a lighting application 327 (which can be firmware) for lighting control operations, commissioning, maintenance, and diagnostic operations and for controlling communications and/or data processing related to the asset tracking functions of the lighting system. The power distribution circuitry 325 distributes power and ground voltages to the MCU 330, drive/sense circuitry 335, wireless transceivers 345 and 350, and detector(s) 365 to provide reliable operation of the various circuitry on the fixture control/edge gateway 315 chip.

In the examples of FIGS. 6A-C, light fixture 10 also includes a dual-band wireless radio communication transceiver system configured for two way wireless communication. It should be understood that "dual-band" means communications over two different RF bands and/or protocols. In these illustrated examples, the two bands are separated in the RF spectrum. For example, a radio frequency transceiver system may be configured to transmit and receive signals in a second frequency band for some purpose(s) (e.g. fog gateway communication) that is different from the first frequency band. In some examples, each of the edge gateways may be configured to transmit the aggregated message via radio frequency transceiver assigned to lighting system control, which for tracking purpose at least includes transmissions for receipt by the fog gateway, such as fog gateway 22 of FIGS. 2A-C. The communication over the two separate RF bands can occur simultaneously (concurrently); however, it should be understood that the communication over the two separate RF bands may not actually occur simultaneously. In the examples of FIGS. 6A and 6B, light fixture 10 has a radio set that includes an RF transceiver 345 for sub-GHz communications (also referred to as the system control RF transceiver) and an RF transceiver 350 for Bluetooth RF communications. The transceiver 345, such as a 900 MHz wireless transceiver, may issue control instructions for lighting control via a nodal network (e.g., the network of RF-enabled wireless communication nodes, such as 133 of FIG. 1). This transceiver 345, for example, may be used for wireless communication over one RF range with other light fixtures for lighting control purposes and for asset tracking tag location estimation both via the nodal network. Two transport methods may be used via the network layer function of the transceiver 345: unicast and multicast. The transceiver 345 engages in multicast group communication of a one-to-many (e.g. a flooding network protocol) or a many-to-many distribution where group communication is addressed to a group simultaneously (e.g. multiple fixtures commonly assigned to function together, such as fixture 1, 5 and 9, or a group of asset tracking tags, such as 10 and 20, of FIGS. 2A-2C).

Another type transceiver 350, such as a 2.4 GHz BLE (Bluetooth) wireless transceiver receives commands from the fog gateway and/or a commissioning device such as a user terminal (not shown in this example), which relate to commissioning, maintenance, and diagnostics of the lighting fixtures. This second transceiver 350 is for point-to-point communication between the edge gateway and the fog gateway, over a second of the two different RF frequency bands (i.e. wireless communication bands), of information (such as aggregated messages in the asset tracking location estimation process explained with reference to FIGS. 1-4B). In addition, the second transceiver 350 may receive from the fog gateway control and systems operations information, concurrently with at least some communications over the first wireless communication band of the first transceiver 345. In other configurations, BLE could be used for communications between RF enabled nodes and edge gateways; and WiFi or the 900 MHz wireless band/protocol could be utilized for communications of the edge gateways with the fog gateway.

In an alternate implementation, the first transceiver used for communications with other fixtures within range for commands or the like related to lighting operations may be a 2.4 GHz BLE (Bluetooth) wireless transceiver and the second transceiver for communication with the fog gateway may be a different type of transceiver, such as a WiFi wireless transceiver.

As shown, the MCU 330 includes programming in the memory 322 which configures the CPU (processor) 323 to control operations of the respective light fixture 10, including the communications over the two different wireless communication bands via the dual-band wireless radio communication interface system 345, 350. The programming in the memory 322 includes firmware/software that enables various light fixture operations, include operations asset tracking tag communication and location estimation processes as well as commissioning and maintenance of the light fixture via a lighting system fog gateway, such as 130 or 22 of FIGS. 1 and 2A-C, respectively. The programming in the memory 322 may, for example, enable the processor 323 to carry out lighting control operations over the system 100 via the network of RF-enabled wireless communication nodes of FIG. 1, or the system 200 of FIGS. 2A-2C.

Three different CPU and memory architectures are shown for the fixture control/edge gateway 315 and the MCU 330 of the light fixture 10 in FIGS. 6A-6C; and FIG. 6C shows a fixture configuration using a dual band wireless transceiver system (that generally implements communications functions similar to the transceivers 345, 350). In FIG. 6A, in addition to the memory 322 and the CPU 323 of the MCU 330 itself, the first transceiver 345 and the second transceiver 350 each include a separate memory (not shown) and a processor (not shown).

In FIG. 6B, the MCU 330 itself does not include a separate memory 322 and a CPU 323. Instead, only the first transceiver 345 and the second transceiver 350 each include a separate memory 322 and a processor 323. For efficiency purposes, such as to save manufacturing costs and conserve power (e.g., line power or battery power), the memory 322 and CPU 323 of the first transceiver 345 is selected to perform processing because the majority of processing (normal lighting control operations) occur over the sub-GHz wireless control network 5. Hence, in the example of FIG. 6B, the sensor/control module 315 includes a total of two processors and two sets of memory.

In FIG. 6C, the MCU 330 comprises the dual band RF transceiver on chip (SOC) 345, 350; and the MCU 330 itself does not include a separate memory 322 and a CPU 323. Instead, the first transceiver function and the second transceiver function are integrated and combined into the chipset with the MCU 330. Hence, in the example of FIG. 6C, the fixture control/edge gateway 315 includes a total of one processor and one set of memory. Integrating the first transceiver function and second transceiver function into a dual band SOC chipset with the MCU 330, which saves manufacturing costs and conserves power (e.g., line power or battery power).

Operationally, the process described with respect to FIGS. 2A-2C and 3-5 remains substantially the same when the edge gateway is configured with the first RF transceiver and the second RF transceiver or the dual band transceiver. For example, the processor 323 of FIGS. 6A-6C may convert some number the node asset messages generated in response to receipt of the basic messages at various of the RF enabled nodes from an asset tracking tag, according to protocol, into a data packet suitable for transmission via the second RF transceiver as an aggregated message, or other type of message, such as a status message, control signal acknowledgement or the like. Conversely, the processor 323 of FIGS. 6A-6C may be configured to receive signals via the second RF transceiver and convert the received signals according to a protocol into data packets suitable for transmission via the first RF transceiver to, for example, either the asset tracking tags or to RF enabled nodes implemented in other fixtures.

FIG. 7 illustrates a specific example of a system configuration and message flow diagram that utilizes system-on-a-chip (SOC) configurations for an asset tracking tag system, such as those shown in FIGS. 2A-3. For convenience, the drawing shows a single asset tracking tag "No. 1," which has a uniquely identified BLE tag identifier as in earlier examples. The example includes RF-enabled end nodes, referred to here as (ATs) 71-75. The nodes may be in light fixtures or separately deployed in the space.

Each of nodes (AT) 71-75 is configured with a BLE SOC that provides BLE communication capabilities for the respective ATs 71-75. In this example, the BLE SOC in each of the nodes (AT) 71-75 enables receipt of basic messages from the asset tracking tag as well as communication of node asset messages. Each AT has a BLE identifier that is globally unique to the respective AT. Of the fixtures 750, two are shown as being configured as edge gateways (e.g., 76 and 77) and one is shown as a BLE-only fixture, such as fixture 4 of FIG. 2A.

The nodes (AT) 71-75 are configured to receive BLE compatible basic messages from the asset tag (as shown for example as three dashed arrows from the tag to ATs 71-73) via the BLE SOC in the respective nodes. Upon receiving a basic message via the BLE SOC of the node, the BLE SOC may measure a signal attribute of the received basic message. The node BLE SOC is configured to extract the tag identifier and sequence number from the basic message, extract the respective node ID from memory, and generate a node asset message by translating the data from the basic message into a format suitable for transmission via the BLE frequency band to an edge gateway.

The light fixtures serving as edge gateways 76 and 77 are configured with two different RF transceivers, a BLE SOC that includes a BLE transceiver and a Sub-GHz SOC that includes a sub-GHz transceiver. Both the BLE SOC and Sub-GHz SOC are coupled to a memory, such as SPI flash memory. The edge gateways 76 and 77 are configured to receive BLE compatible node asset messages from the nodes ATs 71-75 via the BLE SOC in the respective gateways (as shown for example as four dashed arrows from ATs 71-73 to the gateways 76, 77). Upon receiving some number of the node asset messages via the BLE SOC of the edge gateway, the BLE SOC may extract and process data from those messages to generate an aggregated message from all of the received node asset messages. The respective edge gateway sub-GHz SOC may forward the aggregated message for processing by the fog gateway 770.

In the example of FIG. 7, the fog gateway 770 is configured with a fog gateway adapter 771. The fog gateway adapter 771 has a sub-GHz SOC that includes a 900 MHz transceiver, a processor (CPU), and a serial port. The serial port allows the fog gateway adapter to connect to and receive power from the fog gateway 770. The fog gateway adapter 771 receives the aggregated messages and may via the CPU process the received aggregated messages as described with reference to FIGS. 4A and 4B. Alternatively, the received aggregated messages may be passed to fog gateway 770. Information in the of an ordered tuple is used to estimate, or obtain an estimate of, a location of the asset tracking tag as of the time when the basic message was transmitted by the asset tracking tag.

Examples of estimating the location of an asset tag may include forming an ordered node identifier tuple in response to the aggregated messages received by the fog gateway by processing the respective node identifiers in the aggregated messages based on the asset tracking tag identifier, the basic message sequence number, and possibly the measured signal attribute values contained in the aggregated messages. The tuple may be substantially a list of a number of node identifiers associated with the highest measured signal attribute values.

A computing device implementing the location estimation functionality/application, e.g. at or coupled to the fog gateway, may be configured to determine, based on the generated tuple and the specific node locations associated with the ordered node identifiers in the node identifier tuple, that the asset tag is located within a polygonal region in which the vertices of the polygonal region are the specific node locations of the transmitting node identifiers. In a specific example, using three node identifiers, the computing device may be configured to determine a location of the asset tag within a triangular region (e.g. Δabc) formed by using the specific node locations of the three obtained node identifiers as vertices of the triangular region. This determination of the location of the asset tag within the polygonal region in the space may be referred to as a coarse asset tag location determination.

The computing device may evaluate the order of the node identifiers in the list of node identifiers using a data set with a list of inequalities of the measured signal attributes. The computing device, for example, may as part of the evaluation compare the order of the node IDs in the tuple to an order of elements in the inequalities of the obtained data set or look up table. Based on the results of the comparison, the computing device may identify an inequality corresponding to an order of the node IDs in the list of node identifiers. As part of the list of inequalities, each inequality may include an indication of a subregion within the determined polygonal region. Using the identified inequality and the subregion indication, the computing device may estimate the location of the asset tag as being located in indicated subregion. This may be considered a fine estimation of the asset tag location.

An additional process may alter the area of the respective subregions based on differences between the respective signal attribute measurements determined by the asset tag. For example, a difference between a first signal attribute measurement value and a second signal attribute value may be determined, a difference between the first signal attribute measurement value and a third signal attribute measurement value may be determined, and a difference between first signal attribute measurement value and the third signal attribute value may be determined. These differences may be referred to as delta values.

A more detailed explanation of an example of this technique of estimating tag location follows, with reference to FIGS. 8A to 11.

The following examples describe a process by which the node identifier associated with the RSS measurement may be used (as part of node asset messages) to convey positional information. In the following discussion, a system and process utilizing the node identifier associated with the RSS measurements having the strongest (or highest) received signal strength values to form a node identifier tuple for position estimation will be described in more detail. An advantages of the described system and process is the ability to transmit a reduced data set related to the location of the transmitting asset tracking tag and/or enable the location to be estimated more accurately based on an ordering of the data within the data set.

It may be appropriate to describe a general process usable for any polygon. In a general example, any point t within a polygon having n corners or vertices (h, i, j, etc., where n 3), there are in general n factorial (n!) inequalities corresponding to n! regions of the polygon. (For certain, special polygons the number may be smaller, as in the case of a right triangle). In this discussion, n! is defined as follows:

$$n! = \prod_{k=1}^{n} k$$

For example, if n=3, then n!=1×2×3=6 (which is the triangular case described above). Or if n=4, then n!=1×2×3×4=24 (not shown).

For n=4 (e.g., for 4 nodes h, i, j, k at the corners of a trapezoid), a typical region-specific inequality may read: th<tj<ti<tk. This inequality may be transmitted by an asset tag as the ordered 4-tuple [hjik].

Thus, in this general case, an edge gateway processes node asset messages and identifies the n closest RF enabled nodes based on the measured RSS values (i.e. the n closest nodes having received and measured the strongest RSSs, which may include duplicates). While the description herein explains an implementation utilizing 3 nodes as the general case, it is contemplated that other configurations or implementations may use greater than 3 nodes.

Figure 8A:
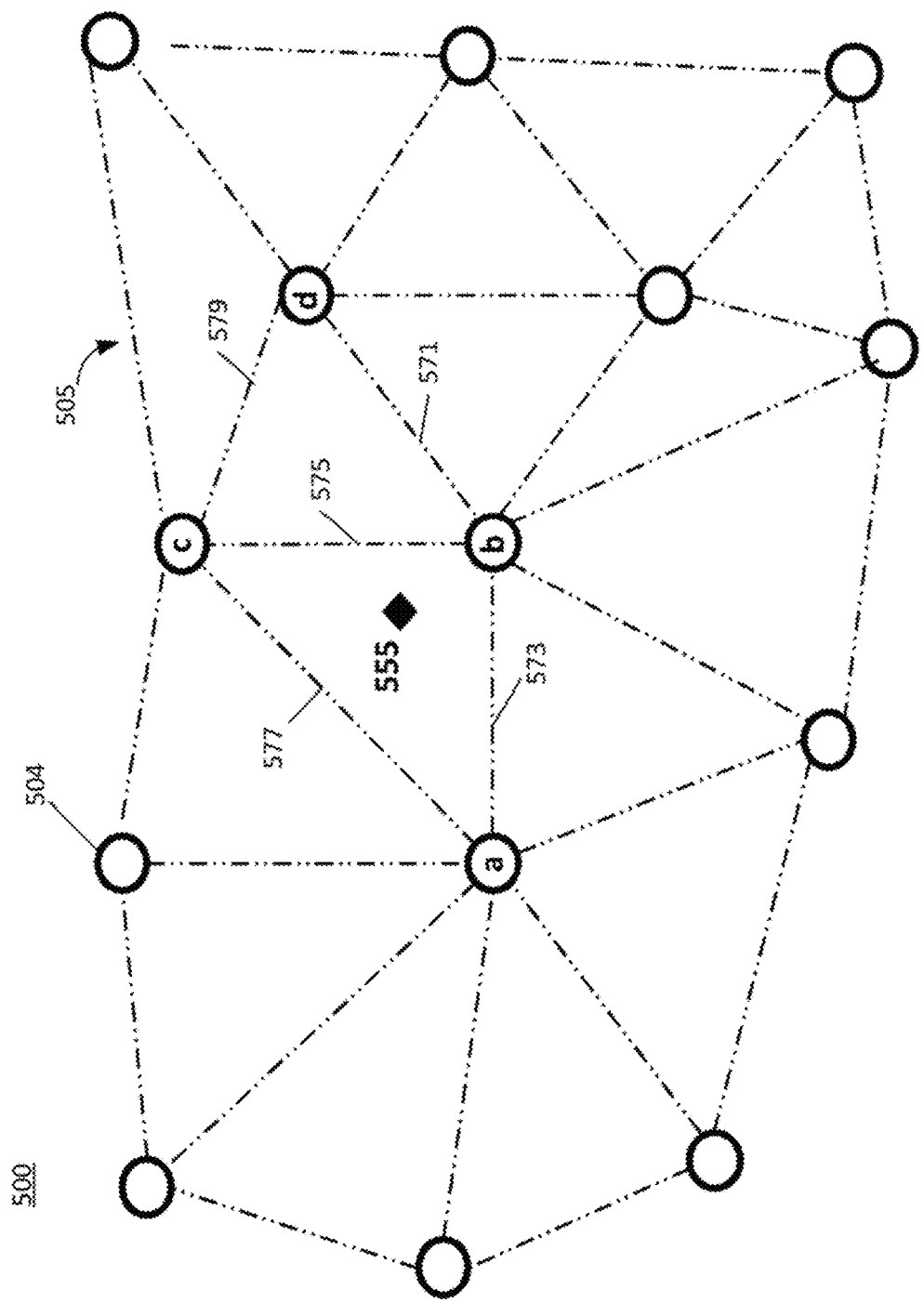
FIG. 8A is a diagram of an example of a network of RF-enabled wireless communication nodes, e.g. RF-equipped lighting devices, useful for describing location estimation examples.

A more detailed process example is described with reference to FIGS. 8A to 10. As shown in FIG. 8A, a network 500 may include a number of nodes, such as 504. The nodes 504 may be configured similar to the RF-enabled lighting device 404 of FIG. 4, but may also be RF only nodes, such as an RF beacon 405, 405' of FIG. 4. An asset tag 555 may be located within a space, such as space 505 of the network 500.

For example with reference to the example of FIG. 8A, the fog gateway supplies the obtained node identifiers to a location estimation functionality/application on that gateway or on a back end computing device as a 3-tuple (e.g., three-element set such as, for example, abc). The three node identifiers in the generated tuple may be ordered within the tuple, for example, from the node identifier with the highest RSS to the node identifier with the lowest RSS or from the node identifier with the lowest RSS to the node identifier with the highest RSS. Of course, the node identifiers may be any form of alphanumeric code or the like. The limits on the length of the identifier may be the amount of data that can be transmitted by the asset tag 555. The location estimation functionality/application may have access to a database containing information related to the space 505 (represented for example by a facility's floor plan, lighting map, grid map or the like). The database may store the physical locations of all of the RF-enabled nodes within the space 505, such as a, b, and c in FIG. 8A. Nodes a, b, c and 504 may be similar to RF-enabled nodes discussed above with regard to the earlier drawing figures. The tag location estimating (LE) application may be configured to estimate a location of the asset tag 555 based on the three node identifiers in the generated tuple and the known physical locations of the three identified nodes to make a coarse estimate of the location of the asset tag, such as 555. For example as shown in FIG. 8A, the computing device, such as the fog gateway or a server, may use the known physical locations of the respective nodes retrieved from the database to determine that the location of the asset tag 555 of FIG. 8A is somewhere within triangle Δabc (having sides 573, 575 and 577).

For example, the asset tag 555 may send basic message signals for receipt by respective RF-enabled nodes, for example, nodes a-d in the network, as well as the other nodes, such as 504, as the tag 555 is moved about the space 505. The nodes receiving such basic messages generate and transmit node asset messages to the edge gateways.

Each node in the network 500 may be considered a vertex of a hypothetical triangle, and each hypothetical side of the respective triangle is shown in FIG. 8A as dashed lines 571, 573, 575, 577 and 579. For example, the hypothetical sides 571, 573, 575, 577 and 579 are shown connecting one node or triangle vertex to another node or another vertex of the triangle. Since the physical locations of nodes a, b and c within the space 505 are known to the computing device, a physical region approximated by any triangle formed by the nodes may be selected as an estimate of the asset tag's estimated physical location within the space based on three node identifiers a tuple. The computing device may use the whole triangle with the node identifiers at the vertices as a location estimate, e.g., which may referred to in the database as a general location, such as the men's clothing section, aisles 1 and 2, vestibule area, café area, pharmacy, warehouse section one, region PQR (where P, Q and R are node identifiers/vertices), or the like. Alternatively, in other examples, the tag location estimating location estimation functionality application executed by the fog gateway and/or additional computing device may perform calculations and/or comparisons using information derived from the order of the node identifiers in the generated tuple and/or additional information related to measured signal attributes to generate a more precise estimate of the tag location within the particular triangle. As a result, this process may provide a coarse determination of the location of asset tag 555 as the physical locations of the respective nodes a, b and c may be tens of feet apart.

When configured to perform a fine estimate of the asset tag location, the tag location estimation application may make a finer estimate of location of the asset tag based on the order of the three node identifiers in the generated tuple and locations of the three identified nodes. Examples that utilize the order of the node identifiers in the generated tuple for more accurate location estimates are discussed in more detail in the following discussion.

In another example, an additional improvement to the system and process provides both an initial coarse asset tag location estimation and then a fine asset tag location estimation via the processes described above. The additionally improved coarse-plus-fine asset tag location estimation system may also utilize the node identifiers associated with the RSS measurements having the strongest received signal strength values. The system implementing the additionally improved estimation is configured to perform additional comparisons that enable the tag to provide more detailed information without increasing the amount of data transmitted by the nodes or edge gateways.

As explained in the following discussion, an advantage of the further improved system and process is the capability to perform the fine location estimate or determination of the transmitting asset tag within the space while transmitting a data set that is substantially the same as the data set transmitted for the coarse asset tag location estimation process. The further improved system and process enable the location of the asset tag within the space to be determined more accurately based on an ordering of the node identifiers within the transmitted data set, or generated tuple.

It may be appropriate at this time to discuss an operational example of the improved accuracy process performed by an asset tag sending an RF basic message signal broadcast to the RF-enabled nodes in various light fixtures, where the nodes transmit node asset messages to the edge gateway, and the edge gateways transmit aggregated messages to the fog gateway. The process flowchart of FIG. 9 illustrates an example of such a process 600. The process 600 will be described with reference to the network example of FIGS. 8A and 9.

In FIG. 8A, the wireless nodal network 500, may be configured to receive a basic message RF signal from any asset tag 555 within the space 505 at some number of the radio frequency-enabled nodes, such as a, b, c and d within the space 505. Each node that receives the basic message may measure the RSS of the basic message signal as received at the respective node. For example, the measured RSS value may be a single RSS measurement (e.g., measured from one signal received from a respective node), an averaged RSS measurement (e.g. averaged over several measurements of signals received from the same node), a median RSS measurement (e.g. a median determined from several measurements of signals received from the same node), or the like. Each RF-enabled wireless communication node that receives the basic message such as a, b, c and d, may be configured to transmit a node asset message to an edge gateway. Each such node asset message includes the asset tracking tag identifier for tag 555, the basic message sequence number (if provided), a respective node identifier of the respective RF-enabled wireless communication node (a, b, c or d in the illustrated example), and the value of the measured signal attribute of the basic message measured by the respective RF-enabled wireless communication node that is transmitting the respective node asset message.

Hence, in the process flow of FIG. 9, the asset tracking tag broadcasts via its RF transceiver a signal containing a basic message; and that basic message contains the tag ID of RF-enabled asset tracking tag and may contain a message sequence number. Steps 610 to 615 occur at some number of the RF-enabled nodes, e.g. at nodes a, b, c and d in the network 500 of FIG. 8A; and the process 600 may include, for example, receiving the basic message at those RF-enabled nodes in parallel occurrences of step 610.

Each of the RF-enabled nodes that have received the transmitted basic message measures a signal attribute of the received basic message. Although other signal attributes may be measured instead or in addition, the example of FIG. 9 utilizes a measurement of received signal strength to produce an RSSI value in instances of step 615 performed at the nodes that received the basic message.

The respective RF-enabled nodes generate respective node asset messages. In the example, each RF-enabled node that received the basic message extracts the tag ID and the sequence number from basic message radio signal in a respective instance of step 620. In an instance of step 625, each RF-enabled node that received the basic message generates an aggregated node asset message. Each respective node asset message contains the node identifier (NID) of the respective RF-enabled node, the asset tag ID, the measured signal attribute (e.g. RSSI value) as measured at the particular RF-enabled node and any additional information included in the basic message from the asset tracking tag. Each RF-enabled node broadcasts their respective node asset message to transmit the message to one or more of the edge gateways, to complete the processing in step(s) 625.

Steps 630 to 640 to produce and send an aggregated message to the fog gateway occur at one of the edge gateways; and similar steps are implemented at one or more other edge gateways to deliver one or more other aggregated messages as generally shown at 640*a* in FIG. 9.

With reference to the steps 630 to 640, the edge gateway may perform edge gateway processes to reduce the number of received node asset messages for aggregation, to a number that may be efficiently transmitted in the aggregated message relating to the asset tracking tag as of the time that the tag transmitted the basic message. By way of general illustration, the process flow includes a step 630 in which the edge gateway discards any duplicate data and selects two or more (e.g. five in the example of FIGS. 4A and 4B) of the strongest measured received signal strengths. In step 635, the edge gateway obtains a respective node identifier (NID) associated with each of the selected highest measured received signal strengths, essentially identifying the node that reported receiving the tag's basic message and measured the respective signal strength (e.g. RSSI value).

Using this information, the edge gateway generates and transmits an aggregated message in step 640. The edge gateway, for example, may be configured to generate an aggregated message that includes the node basic message (e.g. tag ID, sequence number and any other relevant information from that message) together with the selected receiving node identifiers and RSSI values from the RF-enabled nodes selected in the processing of steps 635 and 640 (see also discussion of FIGS. 4A and 4B above). The edge gateway broadcasts the resulting aggregated message for reception by the fog gateway to complete step 640. The fog gateway receives one or more similarly generated/transmitted aggregated messages from one or more other edge gateways in step 640*a*.

The additional process steps 645 to 665 in FIG. 9 may be implemented in the fog gateway. From the fog gateway perspective, the process 600 includes receiving aggregated messages at steps 640, 640*a* from edge gateways that received and processed the node asset messages from some number of the RF-enabled nodes, e.g. from the respective nodes a, b, c, and d in the network 500. Although not separately shown, the aggregated messages may be correlated by tag identifier and sequence number.

The fog gateway may perform fog gateway processes to reduce the number of received node asset messages from the aggregated message, to a number that may be efficiently used for the location estimation, for example, into an ordered list of three network identifiers in the form of a three-number tuple. For that purpose, the subsequent fog gateway step 645 generally involves discarding any duplicate data and selecting the three strongest measured received signal strengths. In step 650, the edge gateway obtains a respective node identifier corresponding to each of three of the respective received radio signals having the strongest measured received signal strengths. As reported in the aggregated messages, for example, the aggregated messages may have included the node identifier of each of the respective RF-enabled nodes a, b, c, and d and respective RSSI values based on measurements of the basic message radio signal at those nodes. In this way (650), the fog gateway obtains identifiers for the three nodes having reported the three highest measured received signal strengths (e.g. three highest RSSI values), which reported receiving the tag's basic message (at the time corresponding to the sequence number).

Figure 8B:
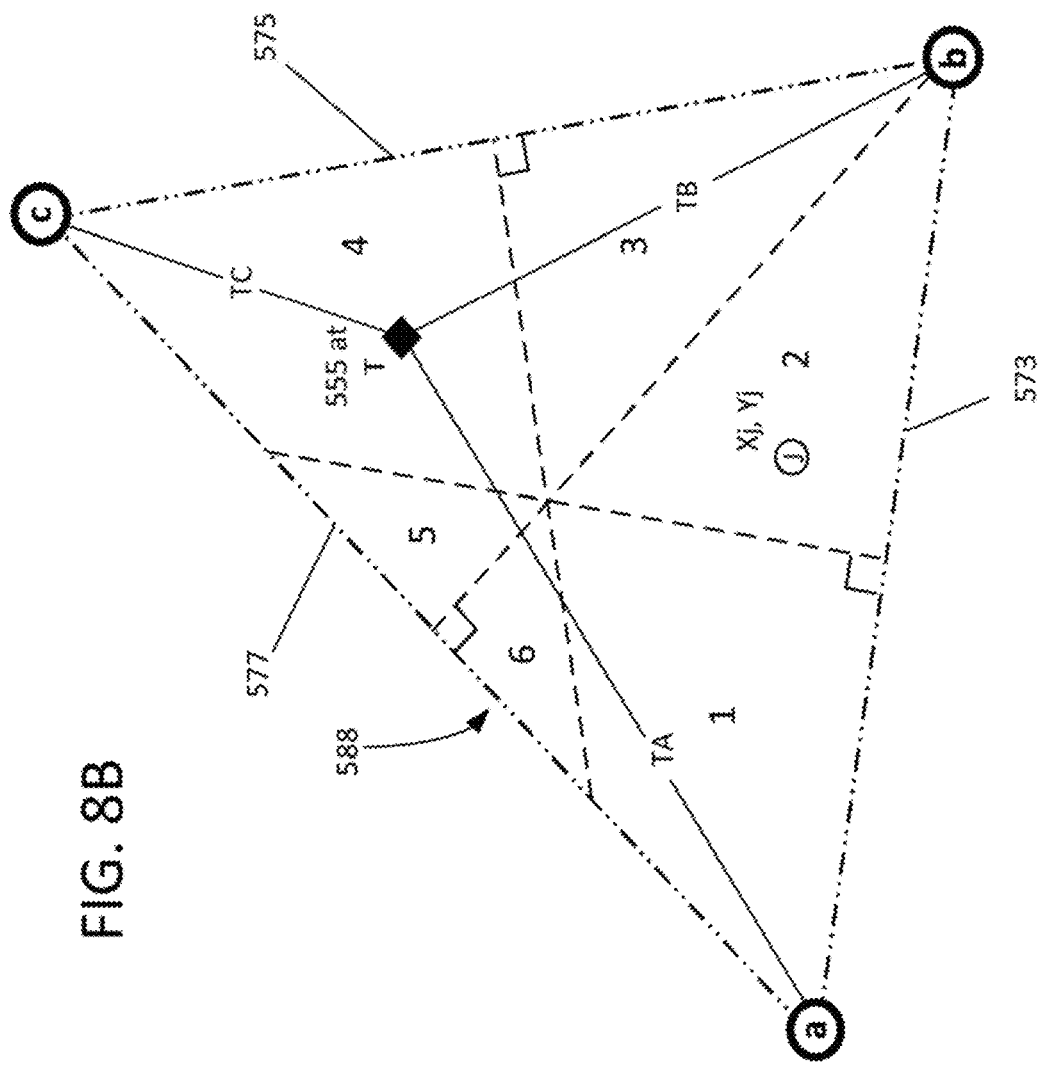
FIG. 8B shows a more detailed illustration of an area within the space serviced by the network of RF-enabled wireless communication nodes shown in FIG. 8A and aspects thereof considered in a location estimation based on identification of three of the nodes in an ordered tuple.
Figure 10:
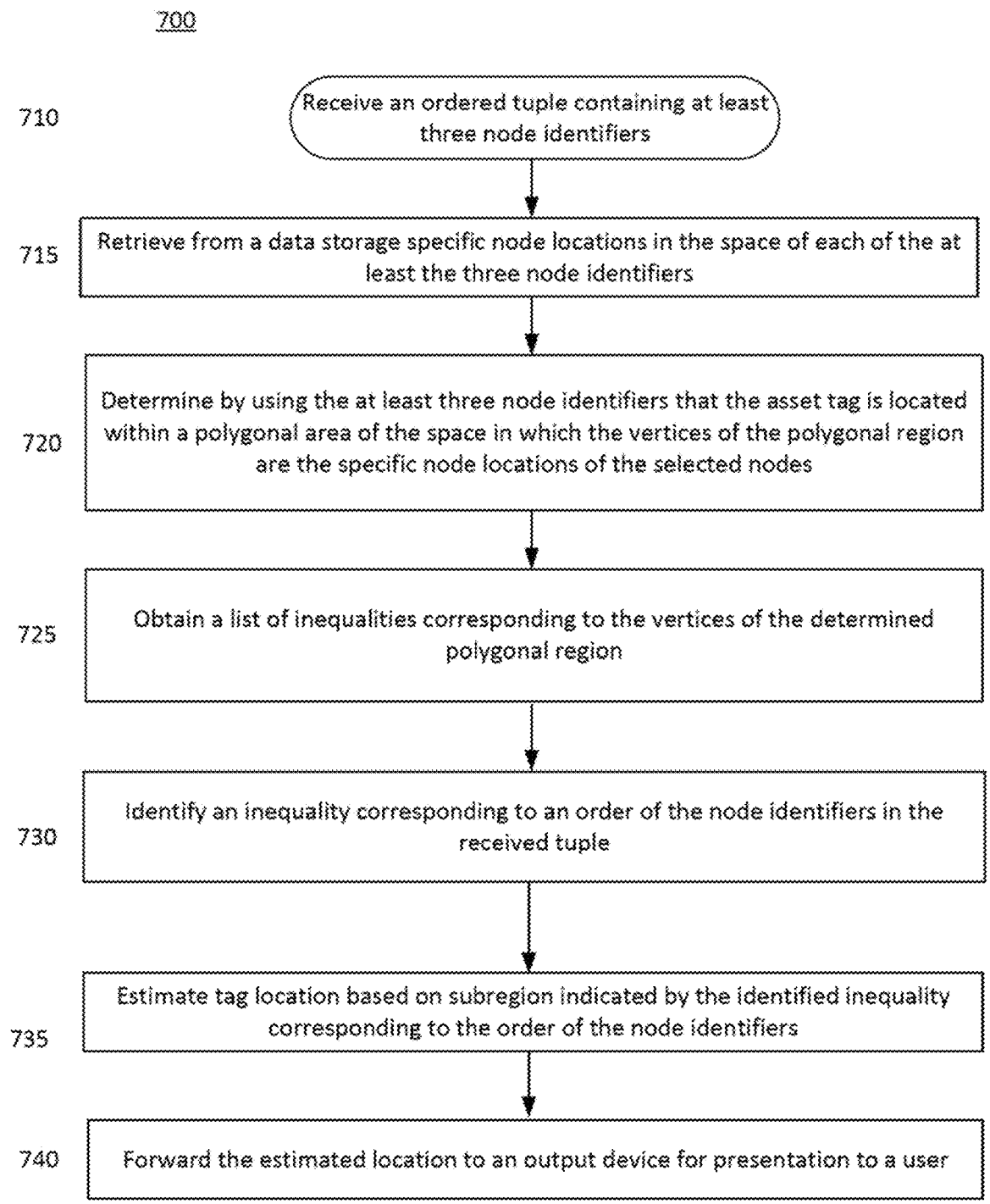
FIG. 10 is another flow diagram of a process example illustrating a process for estimating a location of an asset tag within a space, based on the ordered tuple.

The programming may enable the fog gateway to compare, at 655, the measured RSSs of each of the selected three transmitted node identifiers to one another. FIG. 8B is useful for explaining the remaining steps of the process 600 of FIG. 9. FIG. 8B is a more detailed diagram showing a more detailed illustration of an area within the space serviced by the network of wireless RF nodes and/or RF-equipped lighting devices shown in FIG. 8A.

In the example process 600 of FIG. 9, based on the results of the comparison at 655, the fog gateway may generate, at 660, a tuple containing the three obtained node identifiers. As part of the process performed at 660, the fog gateway may rank the ordinals of the tuple according the measured RSS of the respective three obtained transmitted node identifiers.

For example, a first ordinal in the ordered tuple may represent the obtained node identifier associated with the strongest (or highest) received signal strength value of the measured received signal strengths of the three obtained node identifiers. The second ordinal may represent the selected node identifier associated with an intermediary received signal strength value of the measured received signal strengths of the three obtained node identifiers. The third ordinal representing a lowest of the three obtained node identifiers. Alternatively, the reverse order may be used. For example, a first ordinal representing the obtained node identifier may be associated with the lowest received signal strength value. The second ordinal representing the selected node identifier associated with an intermediary received signal strength value of the measured received signal strengths. The third ordinal may represent a strongest, or highest, received signal strength of the three obtained node identifiers.

The generated tuple may be forwarded at 665 to a tag location estimating application configured to estimate a location of the asset tag. A computing device remote from the asset tag 555 executes the tag location estimating application. For example, the fog gateway may be configured to forward the tuple with the ordered node identifiers to a tag location estimating application, for example, in that gateway or in another computing device. The tag location estimating application upon execution may configure the fog gateway or other computing device to estimate, based on the order of the node identifiers in the generated tuple and the specific node locations associated with the node identifiers of the tuple, a location of the asset tag with respect to the specific node locations of the three node identifiers.

As a result of the determination of nodes a, b and c having the three strongest measured RSS values, the asset tag 555 is likely located within the triangle form by nodes a, b, and c; and FIG. 8B provides a detailed view of the triangle Δabc with sides 573, 575 and 577. This may be sufficient for a general or coarse location estimate.

To more easily describe the fine location estimate process, FIG. 8B shows triangle Δabc segmented into 6 regions. Any point within the triangle Δabc shown in FIG. 8B, may be represented by a coordinate pair such as "xy" including arbitrary point J and the location T of asset tag 555 inside the triangle Δabc. In FIG. 8B, the distances (assume a distance from one point x to another point y) may be represented by a coordinate pair "XY." In the example of FIG. 8B, a distance from the estimated tag location (represented by "T" in the inequalities below) to one of three vertices (i.e. nodes a, b, c) is represented by a letter pair, such as TA, where T represents the tag location and A is the location of vertex (i.e. node) a; TB, where T represents the tag location and B is the location of vertex (i.e. node) b; and TC, where T represents the tag location and C is the location of vertex (i.e. node) c. A relationship between the respective distances may be indicated by one of six (6) possible "distance" inequalities:

TA<TB<TC—distance of tag 555 to vertex a (i.e. node a) is less than distance of tag 555 to vertex b (i.e. node b), which is less than distance of tag 555 to vertex c (i.e. node c);

TA<TC<TB—distance of tag 555 to vertex a (i.e. node a) is less than distance of tag 555 to vertex c (i.e. node c), which is less than distance of tag 555 to vertex b (i.e. node b);

TB<TA<TC—distance of tag 555 to vertex b (i.e. node b) is less than distance of tag 555 to vertex a (i.e. node a), which is less than distance of tag 555 to vertex c (i.e. node c);

TB<TC<TA—distance of tag 555 to vertex b (i.e. node b) is less than distance of tag 555 to vertex c (i.e. node c), which is less than distance of tag 555 to vertex a (i.e. node a);

TC<TA<TB—distance of tag 555 to vertex c (i.e. node c) is less than distance of tag 555 to vertex a (i.e. node a), which is less than distance of tag 555 to vertex b (i.e. node b); and TC<TB<TA—distance of tag 555 to vertex c (i.e. node c) is less than distance of tag 555 to vertex b (i.e. node b), which is less than distance of tag 555 to vertex a (i.e. node a).

Each of the above triple inequalities corresponds to an estimated location in one of six (6) regions of the triangle $\Delta abc$ of FIG. 8B. The three node identifiers in the generated tuple may be ordered within the tuple from highest RSS to lowest RSS (including duplicates).

By using the respective RSS values, the asset tag 555 does not need to measure actual distances from the vertices a, b, c in order to establish which inequalities hold at the tag's location. For example, in order for the location of asset tag 555 to be determined or estimated as being closer to node a than to node b (i.e. distance TA<TB), the computing device making the estimate need only determine that the measured RSS of the signal from node a is greater than the measured RSS of the signal from node b. That is, if RSS_a>RSS_b, is equivalent to TA<TB. As shown in the example of FIG. 8B, the following inequalities may be used to determine the respective region within FIG. 8B, the asset tag may be located:

RSS_a>RSS_b>RSS_c: Tag is located in subregion 1;
RSS_a>RSS_c>RSS_b: Tag is located in subregion 6;
RSS_b>RSS_a>RSS_c: Tag is located in subregion 2;
RSS_b>RSS_c>RSS_a: Tag is located in subregion 3;
RSS_c>RSS_b>RSS_a: Tag is located in subregion 4; and
RSS_c>RSS_a>RSS_b: Tag is located in subregion 5.

However, since the RSSI is not transmitted by the tag and only the node ID of the respective nodes. For example, a look up table may be stored in a memory or database such as the node data base 407 of FIG. 4 that has the following inequality relationships for $\Delta abc$:

TA<TB<TC: Tag is located in subregion 1;
TA<TC<TB: Tag is located in subregion 6;
TB<TA<TC: Tag is located in subregion 2;
TB<TC<TA: Tag is located in subregion 3;
TC<TB<TA: Tag is located in subregion 4; and
TC<TA<TB: Tag is located in subregion 5.

Alternatively, the server may be configured to derive the above inequality relationships based on the node IDs provided in the tuple. In yet another alternative, the server may be configured to directly determine a subregion of the polygon in which the tag is located based on the node IDs and the order of the node IDs in the generated tuple. The geometry of any polygon and the respective subregions within the polygon corresponding to node IDs provided in the tuple may be either stored in memory or derived from the respective node IDs.

An advantage of the disclosed asset tag, system and process is that three RSS comparisons enable the fog gateway to straightforwardly generate a triple inequality that provides sufficient information to provide a unique and finer estimate of the location of the asset tag 555.

The asset tag 555 location is unknown. However, since it appears in every term of the triple inequalities listed above, it is not needed to uniquely specify the tag location as T in the inequality. The inequalities can thus be conveyed by 3-tuples of node IDs (e.g., "TB<TC<TA" can be conveyed as "bca"). Hence, the ordering of the three obtained node identifiers according to their ranking of lowest RSS value to strongest RSS value of the respective received signal strengths in the generated tuple may be equated to an order in one of the respective inequalities (e.g. the node with the lowest RSS<the node with an intermediary RSS<the node with highest RSS). Of course, the reverse order may also be true. For example, the order may be the node with the highest RSS>the node with an intermediary RSS>the node with lowest RSS.

In FIG. 7, the location estimation process performed by the computing device implementing the tag location estimation (LE) application, may perform steps represented in the illustrated example process. When the asset tag orders the transmitting node identifiers of the three nearest nodes to reflect their relative RSSI values, e.g., weakest to strongest, say "bac"—before transmitting them to the computing device, the computing device may use the order of the transmitted node identifiers to more accurately estimate in which respective one of the six regions (e.g., 1-6 in FIG. 8B) within the triangle $\Delta abc$ that the tag is located. By being able to further identify a particular region within the area covered by the triangle $\Delta abc$, a more accurate location estimation may be made as compared to merely estimating the location of the asset tag 555 as being somewhere in the area of the entire triangle $\Delta abc$.

For example, a process that may be performed by the asset tag in combination with a server or other computing device is described in more detail with reference to FIG. 8B. Using triangles for ease of illustration—that is, using the known locations of the three (3) closest nodes to the asset tag 555, the location of the asset tag 555 may be determined to be approximately one of within six (6) subregions of a triangular region (labeled 1-6) formed by nodes a, b and c.

In the example of FIG. 8B, the measured RSS values at each of the nodes may be −20 at node c, −40 at node b, and −50 at node a. The nodes a, b and c are at the vertices of an n-sided convex polygon, such as triangle $\Delta abc$, surrounding the asset tag 555 in FIG. 8B. The system performs an analysis of the RSSI values measured at various nodes as explained in detail above, and orders the obtained node identifiers as in an n-tuple. The computing device determines in which subregion of the n! sub-regions of the triangle the tag is located. The generated tuple, for example, may be forwarded to a tag location estimating application in the fog gateway or another computing device. Upon execution, the tag location estimating application configures the fog gateway or other computing device to estimate a location of the asset tag with respect to the specific node locations of the three node identifiers, based on processing of the order of the node identifiers in the generated tuple and the specific node locations associated with the node identifiers from the tuple.

FIG. 8B shows the six regions 1-6 within an illustrative non-right triangle Δabc that are defined by the six possible sets of inequalities relating the distances from any given point (e.g., tag location) inside Δabc to each of the vertices (i.e. RF nodes). In FIG. 8B, the distance between any two points X and Y may be written "XY" and is shown as a solid line segment. In the example of FIG. 8B, the location of asset tag 555 may be at T, which is closer to node c than to node b (i.e., distance TC<distance TB), closer to node c than to node a (i.e. distance TC<distance TA), and closer to node b than to node a (i.e. distance TB<distance TA). These three inequalities hold for all points in Region 4; that is, they hold no matter where in Region 4 the tag 555 is located. Each region (1-6) corresponds to a unique set of three inequalities; therefore, determining which inequalities hold for a point, such as T, within Δabc suffices to estimate which region of the triangular area the asset tag was in located at the time the signals from the tag were received at and measured by the nodes. Hence, using only the inequalities a computing device may estimate a location of the asset tag 555.

The three distance inequalities for each region (e.g., TC<TB, TC<TA, and TB<TA for Region 4) can be written as a single triple inequality (e.g., TC<TB<TA). The amount of data may be further reduced by eliminating the T and just sending, for example, only the node identifiers CBA in that specific order as the tuple. Using the node identifiers, a computing device may obtain data indicating the specific physical node locations of the obtained nodes within a space. The computing device may determine that the asset tag is located within a triangular region having the vertices (i.e. a, b and c) of the triangular region 588 based on the data indicating the specific node locations of the nodes corresponding to the obtained nodes identifiers. Based on the order of the three node identifiers in the tuple, the computing device may further attribute a weighting between a respective vertex of the vertices and the asset tag location. For example, the first ordinal in the tuple (i.e. C) may be given a first weight, the second ordinal (or intermediary value) in the tuple (i.e. B) may be given a second weight, and the third ordinal in the tuple (i.e. A) may be given a third weight. The computing device using the attributed weights based the order of the three obtained node identifiers in the tuple may estimate the location of the asset tag with respect to the vertices of the triangular region with one of the sub-regions. For example, using the particular weightings, the computing device may determine a default estimated distance away from the node represented by the first ordinal (i.e. C) and then alter that default estimated distance based on the weightings of the second (i.e. B) and third (i.e. A) ordinals to arrive at a final estimated location of the asset tag.

FIG. 7 illustrates an example of a process 700 performed by a computing device to estimate a location of an asset tag.

A tag location estimating application in the fog gateway or another computing device may receive an tuple for the asset tag containing at least three node identifiers in step 710. The at least three node identifiers, for example, are ordered in the tuple according to a strongest or highest ranked signal attribute to a weakest or lowest ranked signal attribute of the received signals of the at least three selected transmitted node identifiers. The signal attributes may include received signal strength, angle of arrival or departure, time of flight or the like. Upon receipt of the tuple having the ordered node identifiers, the fog gateway or other computing device may be configured by the tag location estimating application to access a memory where the specific node locations are stored, and retrieve specific node locations of each of the at least three selected transmitted node identifiers (715).

The fog gateway or other computing device may be further configured to determine, based on the generated tuple and the specific node locations associated with the selected node identifiers from the tuple, that the asset tag is located within a polygonal region in which the vertices of the polygonal region are the specific node locations of the at least three node identifiers (720). In a specific example, using three node identifiers, the tag location estimating application may configure the fog gateway or other computing device to determine a location of the asset tag within a triangular region (i.e. Δabc in FIG. 8B) formed by using the specific node locations of the three node identifiers as vertices of the triangular region. This determination of the location of the asset tag within the polygonal region in the space may be referred to as a coarse asset tag location determination.

The tag location estimating application may obtain, at 725, a list of inequalities corresponding to the vertices of the determined polygonal region. The server may obtain a data set containing the inequalities, or access a look up table, stored in memory of or accessible to the particular computing device. The obtained data set or look up table may contain a list of inequalities for each polygonal region that may be formed from nodes within a space. The order of the transmitted node identifiers may be evaluated by the server with respect to a list of inequalities associated with the determined polygonal region. Continuing with the specific example of three obtained node identifiers as in FIG. 8B, the tag location estimating application may identify an inequality having an order that matches the order of node IDs in the tuple. The tag location estimating application, for example, may as part of the evaluation cause the computing device to compare the order of the node IDs in the tuple to an order of elements in the inequalities of the obtained data set or look up table. Based on the results of the comparison, the computing device may identify an inequality corresponding to an order of the node IDs in the received tuple (730). As part of the list of inequalities, each inequality may include an indication of a subregion within the determined polygonal region. Using the identified inequality and the subregion indication, the server estimates the location of the asset tag as being located in the subregion indicated by the identified inequality corresponding to the order of the node identifiers in the received tuple. For example, in FIG. 8B, the computing device may determine that the asset tag 555 is located in subregion 5 of Δabc because the node identifiers in the tuple output by the asset tag 555 correspond to an inequality that indicates subregion 5 (735).

The computing device may forward (740) the estimated location to an output device for presentation to a user. Examples of an output device may be a computer monitor, a video wall, a mobile device display screen or the like.

Figure 11:
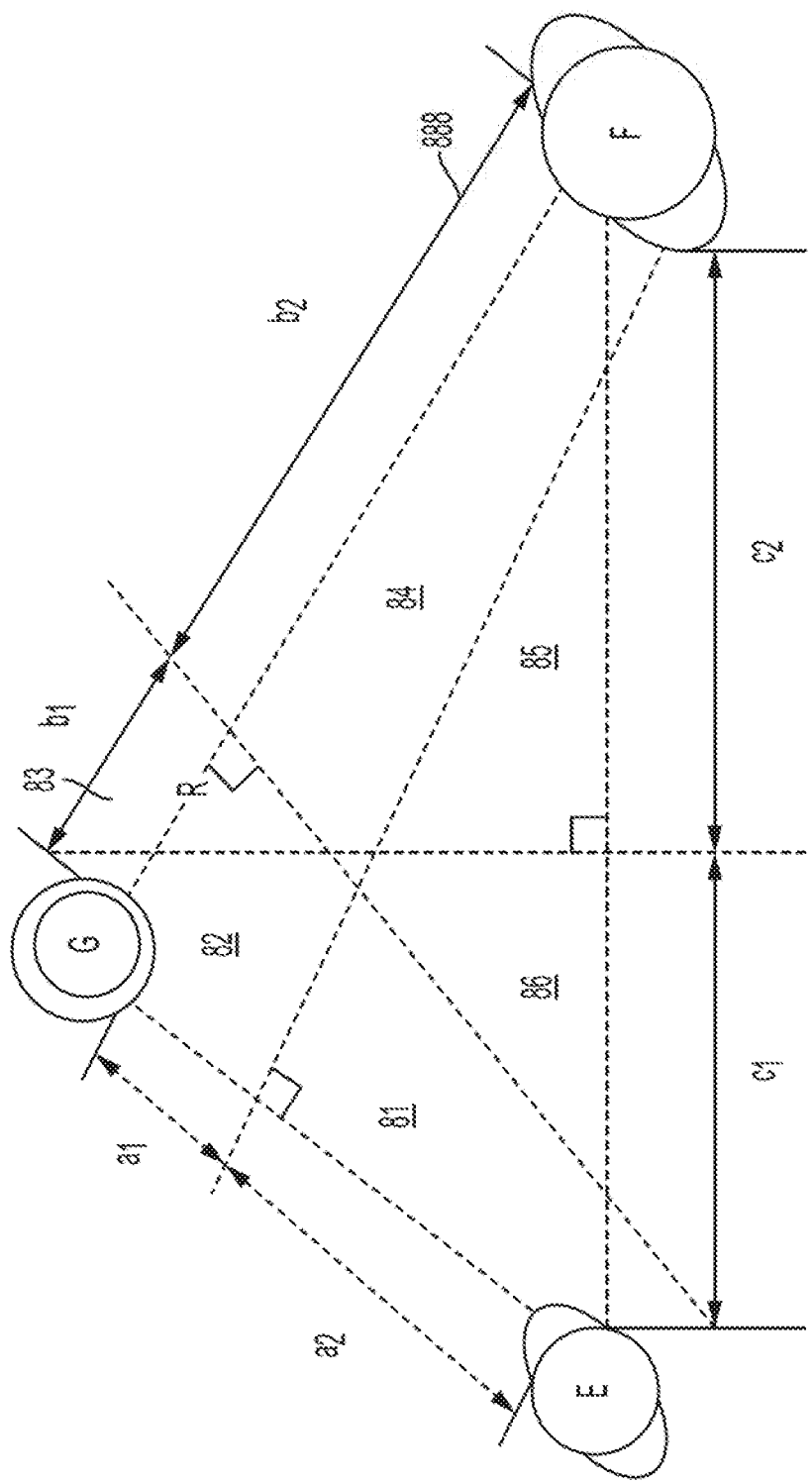
FIG. 11 illustrates a polygonal region useful for explaining an additional function executable by asset tag information processing equipment for providing additional information to further improve asset tag location estimation accuracy.

The foregoing discussion of process 700 described a process for a fine estimate of the tag location. An additional process for further improvement of the accuracy of the asset tag location estimation is also contemplated. This additional process may provide a finer location estimation than that described with respect to FIG. 10. The additional process may alter the area of the respective subregions 1-6 based on differences between the respective RSS measurements determined by the identified nodes. For example, a difference between a first RSS measurement value and a second RSS value may be determined, a difference between the first RSS measurement value and a third RSS value may be determined, and a difference between first RSS measurement value and the third RSS value may be determined. These differences may be referred to as delta values. FIG. 11 illustrates a modified example of FIG. 8B in which the position of the perpendicular lines that segment the triangular area 888 into regions (81-86) may be altered based on ratios generated from delta values.

By using the delta value ratios, the six regions (labeled 81-86) within the triangle area 888 may now vary in area, by decreasing or increasing the area, to more precisely estimate a region in which the asset tag is likely located. For example, the delta value between the RSSIs of node 1 and node 2 may be 5% while the delta value between the RSSIs of Node 1 and node 3 may be 10%. In the example, the region with the smaller percentage difference (e.g. 5%) may have a smaller area than the region area having the larger percentage difference (e.g. 10%).

For example, when the tuple is generated, the fog gateway may generate and/or forward delta values for processing by the tag location estimating application. The tag location estimation application may further configure the fog gateway or other computing device to utilize the delta values as outlined above when estimating the location of the asset tag.

Referring back to the general discussion of a polygon shape, in the case of a nodal network having a given density of nodes in the network, using polygons with more than 3 sides may yield sub-regions much smaller than those within triangles filling/covering the same network. In the case of having smaller regions, the location estimation accuracy is improved with only marginally greater data transmission (e.g., tuples with greater than three transmitting node identifiers).

The system and methodology examples described here are intended to be illustrative, not limiting. In various examples, wireless network nodes may measure angle-of-arrival and other properties of signals received from an asset tag as well as or instead of RSSI values and transmit this information for compilation into a tuple for used by a computing device for tag location estimation. Alternatively or additionally to the performance of calculations by a computing device, computations may be performed at any point in the system, or in a distributed manner. Any additional measured signal attribute data can be combined variously with the RSS-derived information described above. Also, previous location estimates can be used to inform and improve new estimates, for example, Bayesian methods may be used and/or machine learning principles may be used to improve accuracy over time. In sum, a wide variety of location-estimation computations can be made from tag- and/or node-gathered data, based on various geometric and statistical principles; all such computations, not only the examples given here, are contemplated.

The tag location estimation based on node proximity has been represented as a two-dimensional problem; however, similar principles hold over a wide range of three-dimensional settings.

As shown by the above discussion, functions relating to the asset tag location estimates, and the like may be implemented on computers connected for data communication, e.g. with the RF-enabled nodes and associated edge gateways. Although special purpose devices may be used as the fog gateway and/or server in the cloud, such devices also may be implemented using one or more hardware platforms intended to represent a general class of data processing device commonly used to run "server" programming, for example, to perform functions attributed to the location estimation server discussed above, albeit with an appropriate network connection for data communication. Location data also may be delivered to processor-based user terminal devices.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities of such computers involve programming, including executable code as well as associated stored data, e.g. files used for a node location lookup table and/or the updates thereof. The software code is executable by the general-purpose computer; for example, the location estimation functionality application programming runs on the computer or the like serving as the fog gateway or on a networked computer that functions as a location estimation server. In operation, the programming code for a gateway, server computer or user terminal device is stored within the general-purpose computer platform. At other times, however, the software may be stored at other locations and/or transported for loading into the appropriate general-purpose computer system. Execution of such code by a processor of the computer platform enables the platform to implement the methodology to determine an order of the node identifiers within the tuple and/or estimate the tag location, in essentially the manner performed in the implementations discussed and illustrated herein. Firmware for an asset tracking tag, an RF-enabled node and/or an edge gateway similarly may be stored on a general purpose computer and downloaded for storage and execution on a tag, node or edge gateway.

Figure 13:
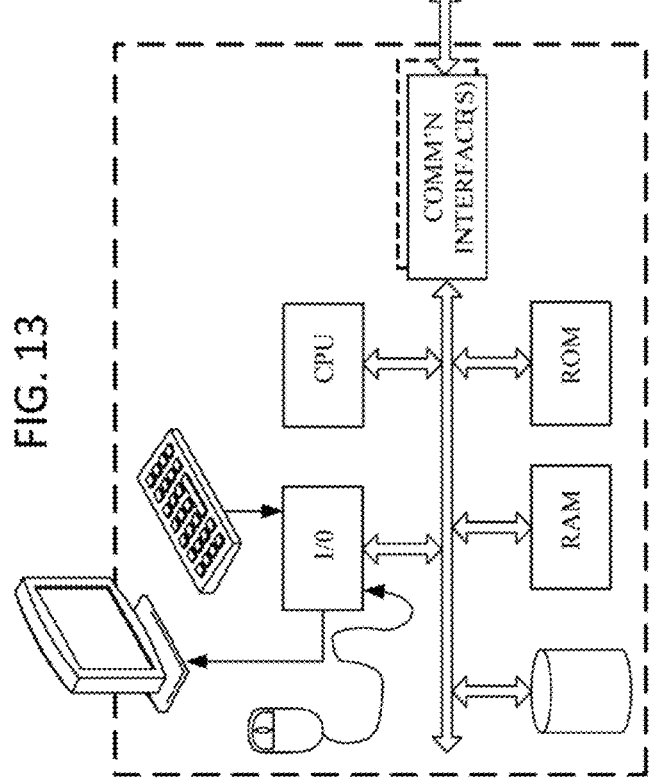
FIG. 13 is a simplified functional block diagram of a personal computer or other work station or terminal device usable for executing location estimation applications and/or receiving location estimation information related to an asset tag.
Figure 12:
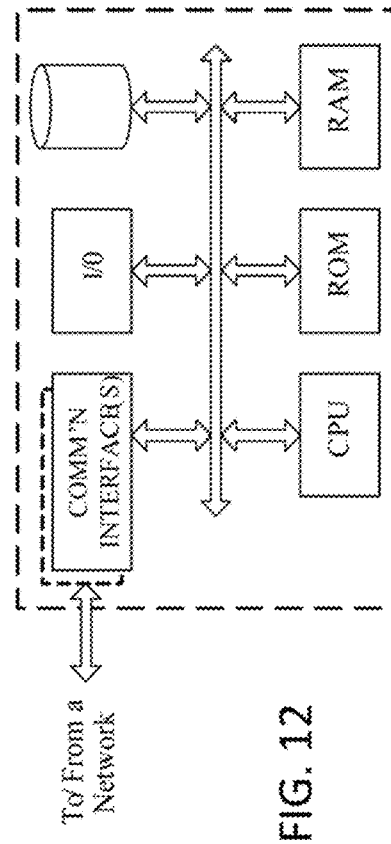
FIG. 12 is a simplified functional block diagram of a computer that may be configured as a host or server, for example, to function as a server for location estimation in the IoT Hub/Cloud included in the example of FIG. 1.

FIGS. 12 and 13 provide functional block diagram illustrations of general purpose computer hardware platforms. FIG. 12 illustrates a network or host computer platform, as may typically be used to implement a server, although such a platform configured with the appropriate communication interfaces also may serve as a fog gateway. FIG. 13 depicts a computer with user interface elements, as may be used to implement a personal computer or other type of work station or terminal device, although the computer of FIG. 13 may also act as a server or gateway if appropriately programmed. It is believed that those skilled in the art are familiar with the structure, programming and general operation of such computer equipment and as a result the drawings should be self-explanatory.

Hardware of a server computer, for example (FIG. 12), includes one or more data communication interfaces for packet data communication over wireless, wired or optical fiber links. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, for example, to distribute the processing load.

Figure 14:
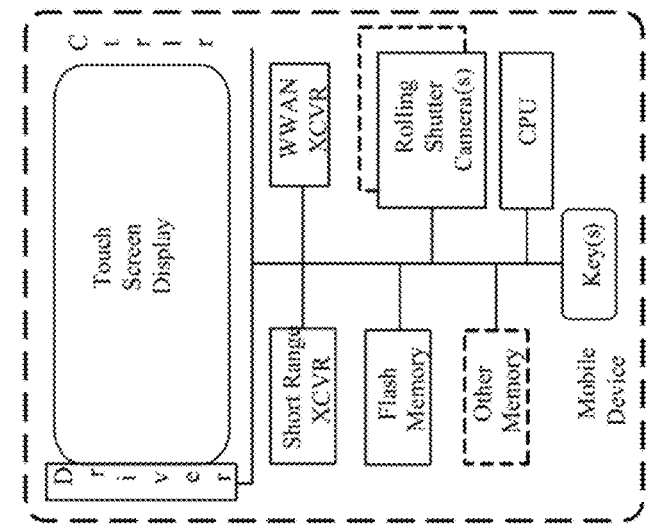
FIG. 14 is a simplified functional block diagram of a mobile device usable for executing location estimation applications and/or receiving location estimation information related to an asset tag.

FIG. 13 depicts a computer with user interface elements, as may be used to implement a portable device or other type of work station or terminal device, although the computer of FIG. 13 may also act as a server if appropriately programmed. Hardware of a computer type user terminal device, such as a PC or tablet computer, may include a data communication interface, CPU, main memory and one or more mass storage devices for storing user data and the various executable programs (see FIG. 13). A mobile device (FIG. 14) type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 14), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith.

Hence, aspects of receiving signals from one or more asset tags, processing the received signals through RF-enabled nodes and gateways, and obtaining location estimate of an asset tracking tag in a space as outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the programming and/or the relevant data. All or portions of the programming and/or the relevant data may at times be communicated through the Internet, telecommunication networks, or various other data networks. Such communications, for example, may enable loading of the programming and/or the database from one computer or processor into another, for example, from a management server or host computer of an enterprise location, or more generally, the location determination or estimation service provider into the computer platform and on-line to perform the relevant tuple generation or location estimation functions in an actual working environment. Thus, another type of media that may bear the programming elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a number of edge gateways distributed about a space, each respective edge gateway comprising an edge gateway processor and an edge gateway radio frequency transceiver system, wherein each edge gateway radio frequency transceiver system is configured to communicate via a first frequency band and a second frequency band;
   a plurality of radio frequency-enabled nodes distributed about the space, wherein each of the plurality of radio frequency-enabled nodes comprises:
     a node processor; and
     a node radio frequency transceiver configured to receive and transmit radio frequency signals via the first frequency band; and
   a fog gateway comprising a fog gateway radio frequency transceiver and a fog gateway processor, the fog gateway radio frequency transceiver configured to communicate via the second frequency band with each edge gateway radio frequency transceiver system;

wherein each respective edge gateway:
has a respective radio frequency coverage area within the space, at least with respect to the first frequency band,
is configured by the edge gateway processor of the respective edge gateway to communicate with a plurality of the radio frequency-enabled nodes within the respective radio frequency coverage area via the first frequency band; and
is configured by the edge gateway processor of the respective edge gateway to transmit an aggregated message including an identifier of each of one or more of the radio frequency-enabled nodes within the respective coverage area, based on a node asset message received from each of the one or more radio frequency-enabled nodes within the respective coverage area, each received node asset message comprising:
an identifier of each respective one or more of the radio frequency-enabled nodes,
an identifier of a radio frequency-enabled tag obtained from a radio frequency signal received from the radio frequency-enabled tag by each of the respective one or more radio frequency-enabled nodes within the respective edge gateway's coverage area, and
a measured signal attribute of the signal received from the radio frequency-enabled tag by the respective one or more radio frequency-enabled nodes within the respective edge gateway's coverage area; and wherein the fog gateway is configured by the fog gateway processor to:
receive a respective aggregated message from each of a plurality of the edge gateways; and
parse the received aggregated messages to obtain a node identifier tuple for use in a determination of location of the radio frequency-enabled tag within the space, and wherein:
the node identifier tuple includes a list of three radio frequency-enabled node identifiers having associated highest signal attribute of signals received from the radio frequency-enabled tag, among all of the radio frequency-enabled nodes having received signals from the radio frequency-enabled tag, and
the three radio frequency-enabled node identifiers are ordered in the list in the tuple according to a ranking of signal attribute of signals received from the radio frequency-enabled tag by the three radio frequency-enabled nodes corresponding to the three radio frequency-enabled node identifiers.

2. The system of claim 1, wherein the node identifier tuple comprises:
a first ordinal representing the node identifier associated with the strongest received signal strength value of received signal strengths measured at three nodes indicated by the three node identifiers,
a second ordinal representing the node identifier associated with an intermediary received signal strength value of received signal strengths measured at the three nodes indicated by the three node identifiers, and
a third ordinal representing the node identifier associated with a lowest received signal strength value of the received signal strengths measured at the three nodes indicated by the three node identifiers.

3. The system of claim 1, wherein the node identifier tuple comprises:
a first ordinal representing the node identifier associated with the lowest received signal strength value of received signal strengths measured at three nodes indicated by the three node identifiers,
a second ordinal representing the node identifier associated with an intermediary received signal strength value received signal strengths measured at the three nodes indicated by the three node identifiers, and
a third ordinal representing the node identifier associated with the strongest received signal strength value of received signal strengths measured at the three nodes indicated by the three node identifiers.

4. The system of claim 1, further comprising a location estimation functionality/application configured to process the three radio frequency-enabled node identifiers as ordered in the list in the tuple to estimate the location of the radio frequency-enabled device within the space.

5. The system of claim 4, wherein the fog gateway is further configured by the fog gateway processor to implement the location estimation functionality/application.

6. The system of claim 4, further comprising:
a computing device coupled for communication with the fog gateway, the computing device including a processor and a memory, wherein:
the fog gateway is further configured by the fog gateway processor to forward the node identifier tuple to the computing device; and
the computing device processor is configured to receive and process the node identifier tuple to implement the location estimation functionality/application.

7. The system of claim 1, further comprising:
a plurality of lighting fixtures distributed throughout the space,
wherein each of the respective radio frequency-enabled nodes is in or collocated with a respective lighting fixture of the plurality of lighting fixtures distributed throughout the space.

8. The system of claim 7, wherein each edge gateway is further configured by the respective edge gateway processor to:
transmit via the second frequency band, to the fog gateway, messages containing: a node identifier update or commissioning information, related to one or more of the radio frequency-enabled nodes; or an edge gateway location message or an edge gateway status message.

9. The system of claim 7, wherein each edge gateway is further configured by the respective edge gateway processor to:
receive via the second frequency band, from the fog gateway, messages containing information for distribution by the respective edge gateway to one or more of the radio frequency-enabled nodes within the respective radio frequency coverage area of the respective edge gateway,
wherein the information in the received messages includes at least one of a software update, a firmware update, a node identifier update, commissioning information, or a lighting command.

10. The system of claim 7, wherein each edge gateway is in or collocated with a respective lighting fixture of the plurality of lighting fixtures distributed throughout the space.

11. A system, comprising:
a number of edge gateways distributed about a space, each respective edge gateway comprising an edge gateway processor and an edge gateway radio frequency transceiver system, wherein each edge gateway radio frequency transceiver system is configured to communicate via a first frequency band and a second frequency band;
a plurality of radio frequency-enabled nodes distributed about the space, wherein each of the plurality of radio frequency-enabled nodes comprises:
a node processor; and
a node radio frequency transceiver configured to receive and transmit radio frequency signals via the first frequency band; and
a fog gateway comprising a fog gateway radio frequency transceiver and a fog gateway processor, the fog gateway radio frequency transceiver configured to communicate via the second frequency band with each edge gateway radio frequency transceiver system;
wherein each respective edge gateway:
has a respective radio frequency coverage area within the space, at least with respect to the first frequency band,
is configured by the edge gateway processor of the respective edge gateway to communicate with a plurality of the radio frequency-enabled nodes within the respective radio frequency coverage area via the first frequency band; and
is configured by the edge gateway processor of the respective edge gateway to transmit an aggregated message including an identifier of each of one or more of the radio frequency-enabled nodes within the respective coverage area, based on a node asset message received from each of the one or more radio frequency-enabled nodes within the respective coverage area, each received node asset message comprising:
an identifier of each respective one or more of the radio frequency-enabled nodes,
an identifier of a radio frequency-enabled tag obtained from a radio frequency signal received from the radio frequency-enabled tag by each of the respective one or more radio frequency-enabled nodes within the respective edge gateway's coverage area, and
a measured signal attribute of the signal received from the radio frequency-enabled tag by the respective one or more radio frequency-enabled nodes within the respective edge gateway's coverage area; and
wherein the fog gateway is configured by the fog gateway processor to:
receive a respective aggregated message from each of a plurality of the edge gateways;
parse the received aggregated messages to obtain a node identifier tuple;
obtain specific locations within the space of radio frequency-enabled nodes associated with the node identifiers in a list in the node identifier tuple;
use the specific node locations to identify a polygonal region, wherein the vertices of the polygonal region are the specific node locations of the transmitting node identifiers; and
identify a location within the polygonal region as an estimated location of the radio frequency-enabled device within the space.

12. The system of claim 11, wherein:
the node identifier tuple includes a list of three radio frequency-enabled node identifiers having associated highest signal attribute of signals received from the radio frequency-enabled tag, among all of the radio frequency-enabled nodes having received signals from the radio frequency-enabled tag, and
the three radio frequency-enabled node identifiers are ordered in the list in the tuple according to a ranking of signal attribute of signals received from the radio frequency-enabled tag by the three radio frequency-enabled nodes corresponding to the three radio frequency-enabled node identifiers.

13. A system, comprising:
a number of edge gateways distributed about a space, each respective edge gateway comprising an edge gateway processor and an edge gateway radio frequency transceiver system, wherein each edge gateway radio frequency transceiver system is configured to communicate via a first frequency band and a second frequency band;
a plurality of radio frequency-enabled nodes distributed about the space, wherein each of the plurality of radio frequency-enabled nodes comprises:
a node processor; and
a node radio frequency transceiver configured to receive and transmit radio frequency signals via the first frequency band; and
a fog gateway comprising a fog gateway radio frequency transceiver and a fog gateway processor, the fog gateway radio frequency transceiver configured to communicate via the second frequency band with each edge gateway radio frequency transceiver system;
wherein each respective edge gateway:
has a respective radio frequency coverage area within the space, at least with respect to the first frequency band,
is configured by the edge gateway processor of the respective edge gateway to communicate with a plurality of the radio frequency-enabled nodes within the respective radio frequency coverage area via the first frequency band; and
is configured by the edge gateway processor of the respective edge gateway to transmit an aggregated message including an identifier of each of one or more of the radio frequency-enabled nodes within the respective coverage area, based on a node asset message received from each of the one or more radio frequency-enabled nodes within the respective coverage area, each received node asset message comprising:
an identifier of each respective one or more of the radio frequency-enabled nodes,
an identifier of a radio frequency-enabled tag obtained from a radio frequency signal received from the radio frequency-enabled tag by each of the respective one or more radio frequency-enabled nodes within the respective edge gateway's coverage area, and
a measured signal attribute of the signal received from the radio frequency-enabled tag by the respective one or more radio frequency-enabled nodes within the respective edge gateway's coverage area; and wherein the fog gateway is configured by the fog gateway processor to:
　receive a respective aggregated message from each of a plurality of the edge gateways; and
　parse the received aggregated messages to obtain a node identifier tuple, and
the system further comprises a computing device coupled for communication with the fog gateway, the computing device including a processor and a memory, wherein:
　the fog gateway is further configured by the fog gateway processor to forward the node identifier tuple to the computing device;
　the computing device processor is configured to receive and process the node identifier tuple to implement a location estimation functionality/application; and
　to implement the location estimation functionality/application, the computing device processor of the computing device is configured to:
　　obtain specific locations within the space of radio frequency-enabled nodes associated with the node identifiers in a list in the node identifier tuple;
　　use the specific node locations to identify a polygonal region, wherein the vertices of the polygonal region are the specific node locations of the transmitting node identifiers; and
　　identify a location within the polygonal region as the estimated location of the radio frequency-enabled device within the space.

14. The system of claim 13, wherein:
the node identifier tuple includes the list of three radio frequency-enabled node identifiers having associated highest signal attribute of signals received from the radio frequency-enabled tag, among all of the radio frequency-enabled nodes having received signals from the radio frequency-enabled tag, and
the three radio frequency-enabled node identifiers are ordered in the list in the tuple according to a ranking of signal attribute of signals received from the radio frequency-enabled tag by the three radio frequency-enabled nodes corresponding to the three radio frequency-enabled node identifiers.

15. The system of claim 14, wherein the node identifier tuple comprises:
　a first ordinal representing the node identifier associated with the strongest received signal strength value of received signal strengths measured at three nodes indicated by the three node identifiers,
　a second ordinal representing the node identifier associated with an intermediary received signal strength value of received signal strengths measured at three nodes indicated by the three node identifiers, and
　a third ordinal representing the node identifier associated with a lowest received signal strength value of the received signal strengths measured at three nodes indicated by the three node identifiers.

16. The system of claim 14, wherein the node identifier tuple comprises:
　a first ordinal representing the node identifier associated with the lowest received signal strength value of received signal strengths measured at three nodes indicated by the three node identifiers,
　a second ordinal representing the node identifier associated with an intermediary received signal strength value received signal strengths measured at three nodes indicated by the three node identifiers, and
　a third ordinal representing the node identifier associated with the strongest received signal strength value of received signal strengths measured at three nodes indicated by the three node identifiers.

* * * * *